US007679862B2

(12) United States Patent
Nakamoto et al.

(10) Patent No.: US 7,679,862 B2
(45) Date of Patent: Mar. 16, 2010

(54) PERPENDICULAR RECORDING HEAD WITH REDUCED THERMAL PROTRUSION

(75) Inventors: Kazuhiro Nakamoto, Kanagawa (JP); Kimitoshi Etoh, Kanagawa (JP); Masayuki Kurita, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 557 days.

(21) Appl. No.: 11/274,853

(22) Filed: Nov. 14, 2005

(65) Prior Publication Data

US 2006/0103982 A1    May 18, 2006

(30) Foreign Application Priority Data

Nov. 12, 2004    (JP)    ............... 2004-329525

(51) Int. Cl.
*G11B 5/127*    (2006.01)
(52) U.S. Cl. .................................. 360/125.32
(58) Field of Classification Search ................ 360/126, 360/123.02, 123.06, 123.09, 125.03, 125.31, 360/125.32, 125.74, 125.75
See application file for complete search history.

(56) References Cited

U.S. PATENT DOCUMENTS

| 4,731,681 | A | * | 3/1988 | Ogata ........................... 360/85 |
| 4,943,882 | A | * | 7/1990 | Wada et al. ............. 360/125.12 |
| 5,108,837 | A | * | 4/1992 | Mallary ....................... 428/336 |
| 5,808,973 | A | | 9/1998 | Tanaka |
| 5,949,600 | A | | 9/1999 | Akiyama et al. |
| 6,233,116 | B1 | * | 5/2001 | Chen et al. ............... 360/125.5 |
| 6,259,585 | B1 | | 7/2001 | Sasaki et al. |
| 6,639,754 | B2 | * | 10/2003 | Taguchi et al. .......... 360/125.12 |
| 6,791,796 | B2 | * | 9/2004 | Shukh et al. ............ 360/125.12 |
| 6,795,277 | B2 | * | 9/2004 | Tsuchiya et al. ............. 360/317 |
| 6,934,128 | B2 | * | 8/2005 | Tsuchiya et al. ............. 360/317 |
| 7,193,814 | B2 | * | 3/2007 | Han et al. ............... 360/125.75 |
| 7,221,538 | B2 | * | 5/2007 | Kawato et al. .......... 360/125.04 |
| 7,310,204 | B1 | * | 12/2007 | Stoev et al. ............. 360/123.02 |

(Continued)

FOREIGN PATENT DOCUMENTS

JP    06-084141    3/1994

(Continued)

*Primary Examiner*—Angel A. Castro
(74) *Attorney, Agent, or Firm*—Townsend and Townsend and Crew LLP; Rambod Nader

(57) ABSTRACT

Embodiments of the invention secure a sufficiently large magnetic field, and deter a protrusion phenomenon of a perpendicular magnetic recording head, causing a problem in implementing a low flying height, while solving problems such as erasure of information in peripheral tracks. In one embodiment, a main pole or a stacked body made up of the main pole, and an auxiliary pole is deposited over an underlayer formed on a substrate so as to be in contact with the underlayer. On top of the main pole or the stacked body, there is deposited a coil, a return pole, and a read element in that order, thereby fabricating a perpendicular magnetic recording head. Further, an additional structure may be added such that an underlayer containing a metal is disposed between the substrate, and the main pole or the stacked body made up of the main pole, and the auxiliary pole, and a heat diffusion layer is disposed between portions of the coil and the substrate, or portions of the coil is disposed closer to the substrate than other portions of the coil.

18 Claims, 16 Drawing Sheets

U.S. PATENT DOCUMENTS

| | | |
|---|---|---|
| 2002/0080524 A1 | 6/2002 | Takahashi et al. |
| 2003/0021065 A1 | 1/2003 | Yamada et al. |
| 2004/0037002 A1* | 2/2004 | Kudo et al. .................. 360/126 |
| 2004/0150912 A1* | 8/2004 | Kawato et al. .............. 360/126 |
| 2004/0196589 A1* | 10/2004 | Lille .......................... 360/125 |

FOREIGN PATENT DOCUMENTS

| | | |
|---|---|---|
| JP | 09-180104 | 7/1997 |
| JP | 2001-101612 | 4/2001 |

* cited by examiner

PERPENDICULAR RECORDING HEAD WITH REDUCED THERMAL PROTRUSION

CROSS-REFERENCES TO RELATED APPLICATIONS

This application claims priority from Japanese Patent Application No. JP2004-329525, filed Nov. 12, 2004, the entire disclosure of which is incorporated herein by reference.

BACKGROUND OF THE INVENTION

The present invention relates to a magnetic recording head for use in a magnetic recording drive, and the magnetic recording drive using the same, and in particular, to a perpendicular magnetic recording head that can be driven even at a high frequency, and a small-sized and large-capacity perpendicular magnetic recording drive enabled to operate by using the same.

A magnetic recording drive is provided with a medium for magnetically recording information, a magnetic recording head for writing information to, or reading information from the medium, a write-read operation control circuit for reproducing information on the basis of output signals from the magnetic recording head, and recording information on the basis of signals inputted, a mechanism for rotating or shifting the medium, and a positioning mechanism for determining the position of the magnetic recording head, relative to the medium. On the surface of the medium, there are included regions for recording information, regions for recording servo data for positioning of the magnetic recording head, and linkage regions disposed between those regions. Since no information is recorded in the linkage regions, it is required that the regions for recording information be expanded by setting up the linking regions as small as possible to thereby enhance the capacity of the hard-disk drive.

In order to promote advances in the hard-disk drive towards larger capacity and miniaturization, it has been proposed that for the medium, use is made of a perpendicular magnetic recording medium having a recording layer made of a hard magnetic material that can be easily magnetized in the perpendicular direction against a substrate. It is effective for recording information at higher density in such a perpendicular medium to provide a soft underlayer between the recording layer and the substrate. That is because the soft underlayer provided enables a recording field produced by the magnetic recording head to be enhanced, and read output to be enhanced.

The magnetic recording head comprises a write element for producing the recording field to record information in the medium, and a read element for reproducing signals written on the medium. FIG. 1 shows a section of the magnetic recording head by way of example. An underlayer 11 made of alumina, and so forth, on the order of 1 μm in thickness, is disposed on a substrate 1 made of $Al_2O_3$-TiC, and over the underlayer 11, there is disposed a read element 2 formed by sequentially depositing a lower shield layer 21 made of $Ni_{80}Fe_{20}$, and so forth, on the order of 1 μm in thickness, a magnetoresistive sensor 20, and an upper shield layer 22 made of $Ni_{80}Fe_{20}$, and so forth, on the order of 1 μm in thickness. Further, a write element 3 is deposited on the read element 2 with a spacer 12 made of alumina, and so forth, on the order of 0.25 μm in thickness, interposed therebetween.

The write element 3 is formed by depositing a return pole 33 made of $Ni_{80}Fe_{20}$, and so forth, on the order of 2 μm in thickness, coils 35 (parts thereof not shown in the figure) made of Cu, and so forth, on the order of 2 μm in thickness, an auxiliary pole 31 made of $Ni_{80}Fe_{20}$, and so forth, on the order of 1.5 μm in thickness, and a main pole 30 made of $Fe_{70}Co_{30}$, and so forth, on the order of 0.2 μm in thickness, in that order. Magnetic fluxes generated by causing a current to flow to the coli 35 are converged by use of a yoke 32 and the auxiliary pole 31 to be guided to the main pole 30. Using magnetic fluxes passing through the tip of the main pole 30, information is written to a medium (not shown in the figure). Magnetic fluxes passing through the medium are fed back to the main pole 30 through the return pole 33.

FIG. 2 is a perspective view showing the write element 3. The coils 35 are not shown in the figure. The auxiliary pole 31 is in a plane shape tapered towards an air bearing surface 4 to cause magnetic fluxes to efficiently converge on the main pole 30. Further, as disclosed in, for example, JP-A No. 36503/2003, because the auxiliary pole 31 is disposed so as to be deposited on the underside of the main pole 30, and further, is recessed from the air bearing surface 4, magnetic fluxes leaking from the auxiliary pole 31 have no adverse effect on recording.

In JP-A No. 101612/2001, it is disclosed that an auxiliary magnetic pole, a main pole, and a return pole are preferably disposed in that order from the side of a substrate for recording information sharply.

BRIEF SUMMARY OF THE INVENTION

With a construction shown in FIGS. 1 and 2, in the case of driving the head at high frequency ranging from 500 MHz to about 1 GHz or higher, a large eddy current is generated particularly at the tips of the auxiliary pole 31 and the main pole 30, respectively, where convergence of magnetic fluxes occurs, so that the tips act as heat generation sources. It has become evident that in case heat is released from the head during recording operation, the heat causes the head to undergo deformation, and parts of the head, such as the main pole 30, and so forth, are protruded several nm out of the air bearing surface 4. In the case of a hard disk drive with an areal recording density on the order of 100 $Gb/in^2$, clearance between the head and the medium is on the order of 5 nm. Accordingly, a problem has become evident in that such protrusion of the head causes frequent occurrences of damage particularly due to the head coming into contact with the medium, and error in positioning of the head, thereby resulting in considerable deterioration with respect to reliability of the hard disk drive. Accordingly, a head with an amount of the protrusion under control is desired.

Eddy current is a current induced into a metal by alternating magnetic fluxes, and the higher the density of passing magnetic fluxes, and the greater variation thereof by the hour, that is, when driven at high frequency, the larger the eddy current becomes while the higher the resistivity of the metal, the smaller it becomes. In the case of perpendicular magnetic recording head, as is evident from FIG. 2, parts of the head where magnetic fluxes particularly converge are limited to one point of the auxiliary pole 31, that is, the tip thereof, and one point of the main pole 30, that is, the tip thereof owing to the structure of the head. In the case of perpendicular recording, it is the main pole 30 that records information, so that it need only be sufficient to work only the respective tips of the main pole, and the auxiliary magnetic pole into micro shapes, respectively. The return pole 33 is set so as to be rather sufficiently large in width to avoid convergence of magnetic fluxes. The reason for this is that the convergence of magnetic fluxes poses a risk of information recorded in the medium being inadvertently erased. Meanwhile, in the case of a ring head for use in longitudinal recording, respective track widths of an upper core and a lower core are tapered so as to be substantially identical in width in order to deter side writing. Consequently, convergence points of magnetic fluxes are spread out over at least two or more spots. As a protrusion phenomenon due to the eddy current loss as described comes to clearly appear particularly with the perpendicular magnetic recording head where the convergence of magnetic fluxes occurs in a pronounced way, a solution to this problem is needed.

FIG. 3 is a top view schematically showing a tapered shape in which the main pole 30, and the auxiliary pole 31 are formed, respectively, and flow of magnetic fluxes 50. FIG. 3A shows the case of the head shown in FIGS. 1 and 2. It is conceivable to adopt an untapered shape for the auxiliary pole 31, as shown in FIG. 3B, in order to control the eddy current loss, that is, heat generation by avoiding the convergence of magnetic fluxes; however, with such a structure, it is impossible in the first place to cause magnetic fluxes to efficiently converge on the main pole, resulting in a decrease in strength of a recording magnetic field that can be produced. For example, on conditions that a recording field of about 15 kOe can be produced with a structure shown in FIG. 3A, a recording field of only about 10 kOe was produced with the structure shown in FIG. 3B. Further, as shown in FIG. 3B, there occurs leakage of a magnetic field of about 5 kOe from the end of the auxiliary pole 31, on both sides thereof, so that there is a very high risk of information in peripheral tracks being inadvertently erased. Accordingly, it is undesirable to adopt the untapered shape for the auxiliary magnetic pole.

One of the features of the invention is to secure a sufficiently large magnetic field, and to deter the protrusion phenomenon of the head, posing a problem in the case of a low flying height coping with recording density larger than 100 Gb/in.$^2$ while solving a problem that the information in peripheral tracks is inadvertently erased.

In the case of using the magnetic recording head constructed by depositing the substrate 1, the read element 2, and the write element 3 in that order, as shown in FIG. 1, relationship among information-writing regions 41 (41a, 41b), a servo region 42 and respective linkage regions sandwiched therebetween is as shown in FIG. 4. In the figure, the magnetoresistive sensor 20 is shown as a representative of the read element 2, and the main pole 30 is shown as a representative of the write element 3. The head travels rightwards at a linear velocity v in relation to the medium. A distance between the magnetoresistive sensor 20 for reproducing information, and the trailing end of the main pole 30 for writing information is d.

When recording information, the information is recorded in a writing region 41a by use of the main pole 30, and subsequently, a servo signal disposed in the servo region 42 is reproduced in order to align a head position with a desired position with high precision. At this point in time, owing to limitation of an electric circuit (R/W-IC) for generating recording current and amplifying a read signal, latency time T from after recording operation until the start of reproducing operation is required. That is because a high frequency current at a large value is generated at the time of the recording operation, and it takes time for the circuit to be sufficiently stabilized even after the current is cut off. Since the head travels at the linear velocity v, it is obvious that a distance, of at least vτ is required between the writing region 41a, and the servo region 42. In addition, as the magnetoresistive sensor 20 is disposed on the leading side of the main pole 30, the magnetoresistive sensor 20 is at a position ahead (rightwards) of the main pole 30 by the distance d. Accordingly, in order to correctly read servo data, a distance of vτ+d as a whole is required.

In the case of recording data continuously after reproducing the servo signal, the electric circuit (R/W-IC) can immediately start recording operation, and since the main pole 30 is on the trailing side of the magnetoresistive sensor 20, a distance between the servo region 42 and a writing region 41b may be essentially zero. However, a distance δ as a margin for variation in travel velocity of the head (variation in rotation of the medium) is normally required. It is a precautionary measure to prevent the servo data from being erased by error due to the variation in the travel velocity of the head.

As described above, with the convention structure, the linkage region existing between the information-writing region 41 and the servo region 42 need to have vτ+d+δ in total length. Since no information is contained in the linkage regions, it is required that these regions be sufficiently reduced in size. In particular, because the magnetoresistive sensor 20 is disposed on the leading side of the main pole 30, an aggregate distance of the distance vτ for coping with time necessary for stabilization of the circuit and the distance d between the main pole and the magneto-resistive sensor is required, between the writing region 41a and the servo region 42, indicating that there is a room for improvement.

Another feature of the invention is to sufficiently reduce the areas of the respective linkage regions disposed between the information-writing regions and the respective servo regions, disposed on the surface of the medium, thereby expanding the information-writing regions, and enhancing the capacity of the hard-disk drive.

The invention is importantly characterized in that a perpendicular magnetic recording head is fabricated by depositing a main pole in a plane shape tapered towards an air bearing surface to cause magnetic fluxes to converge on a stacked body, made up of the main pole and an auxiliary pole, over an underlayer formed on a substrate so as to be in contact with the underlayer, and by depositing coils, a return pole, and a read element in that order on top of the main pole or the stacked body.

The invention is characterized in that in addition to the above, the underlayer containing a metal is disposed between the substrate and the main pole or between the substrate and the stacked body of the main pole and the auxiliary pole, and a heat diffusion layer is disposed between portions of the coils and the substrate, or portions of the coils are disposed closer to the substrate than other portions of the coils, in order to deter the protrusion phenomenon of the head, particularly, among the problems described.

A perpendicular magnetic recording drive is characterized in that the disposition of a perpendicular magnetic recording head and the direction of rotation or traveling of a perpendicular magnetic recording medium are set, such that the write element of the perpendicular magnetic recording head is on the leading side, and the read element is on the trailing side, in order to expand respective information-writing regions, and enhance the capacity of the magnetic recording drive, particularly, among the problems described.

With the invention, it is possible to efficiently release heat generated from the main pole and the auxiliary pole, due to eddy current occurring when driving the head at high frequency, and heat generated from the coils, to the substrate, so that thermal deformation and an amount of protrusion of the head can be controlled, thereby implementing a low flying height. As a result, the perpendicular magnetic recording drive with a high recording density can be implemented. Further, because heat release efficiency is high, the magnetic head can be kept at a low temperature, and probability of troubles with the magnetic head can be lowered, so that the magnetic head and the magnetic recording drive, having high reliability, can be provided.

As with the present invention, by use of the magnetic recording drive wherein the write element is disposed on the leading side, and the read element is disposed on the trailing side, a linkage region that used to require an added-up distance of (vτ) and (d) in the past can be contracted to a differential distance (vτ−d), so that respective information writing regions can be expanded, thereby enhancing the capacity of the magnetic recording drive. Details will be described later with reference to FIG. 9.

DETAILED DESCRIPTION OF THE INVENTION

Embodiments of the invention are described hereinafter with reference to the accompanying drawings.

Embodiment 1

Figure 5:
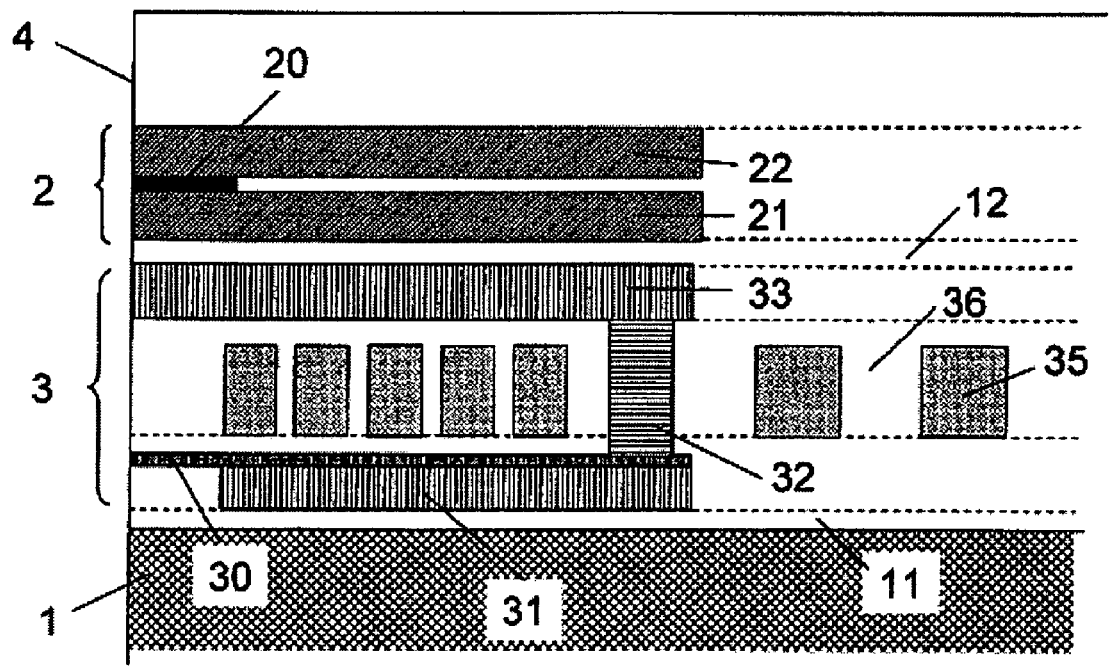
FIG. 5 is a sectional view showing one embodiment of a perpendicular magnetic recording head according to the invention.

FIG. 5 is a sectional view showing an example of a magnetic recording head according to the invention. An underlayer 11 made of $Al_2O_3$, 0.5 µm in thickness, was disposed on a substrate 1 made up of a sintered body of $Al_2O_3$-TiC, and an auxiliary pole 31 for causing magnetic fluxes to converge, and a main pole 30 for recording information in a medium were deposited in that order over the underlayer 11. The auxiliary pole 31 was formed of a soft magnetic material $Ni_{80}Fe_{20}$, 1 µm in thickness, and the main pole 30 was made up of a multilayered film formed by alternately depositing a $Fe_{70}Co_{30}$ film of a soft magnetic material, with saturation flux density of 2.4 Tesla, and a nonmagnetic film of Cr, $Ni_{80}Cr_{20}$, and so forth. The main pole 30 was 0.2 µm in thickness. Both the main pole 30, and the auxiliary pole 31 had a depth 15 µm from an air bearing surface 4, respectively. As a constituent material for the auxiliary pole 31, use is preferably made of $Ni_{80}Fe_{20}$, and so forth, with magnetostriction constant small or slightly negative; however, use may be made of $Fe_{55}Ni_{45}$ with magnetostriction constant positive, but with a small coefficient of thermal expansion by use of such a design idea as adoption of a horizontally long shape, and so forth. By so doing, when ambient temperature rises, a phenomenon of magnetic poles protruding due to thermal expansion can be better deterred.

If a soft magnetic film is formed directly above the substrate 1, the coercivity, and so forth of the soft magnetic film do not indicate sufficiently small values because the substrate 1 made up of the sintered body has microscopic asperities on the surface thereof, thereby often raising a problem. Further, for a substrate 1, use may be made of, for example, Si and so forth; however, if a soft magnetic film is formed directly above the substrate, the coercivity, and so forth do not become small in value either because preferred crystalline orientation of the soft magnetic film is profoundly affected by that of the substrate, thereby posing a problem. In order to sufficiently lessen the effect of the substrate 1, the underlayer 11 from 0.1 µm to several micrometers in thickness is preferably inserted between the substrate 1, and the auxiliary pole 31.

Figure 7:
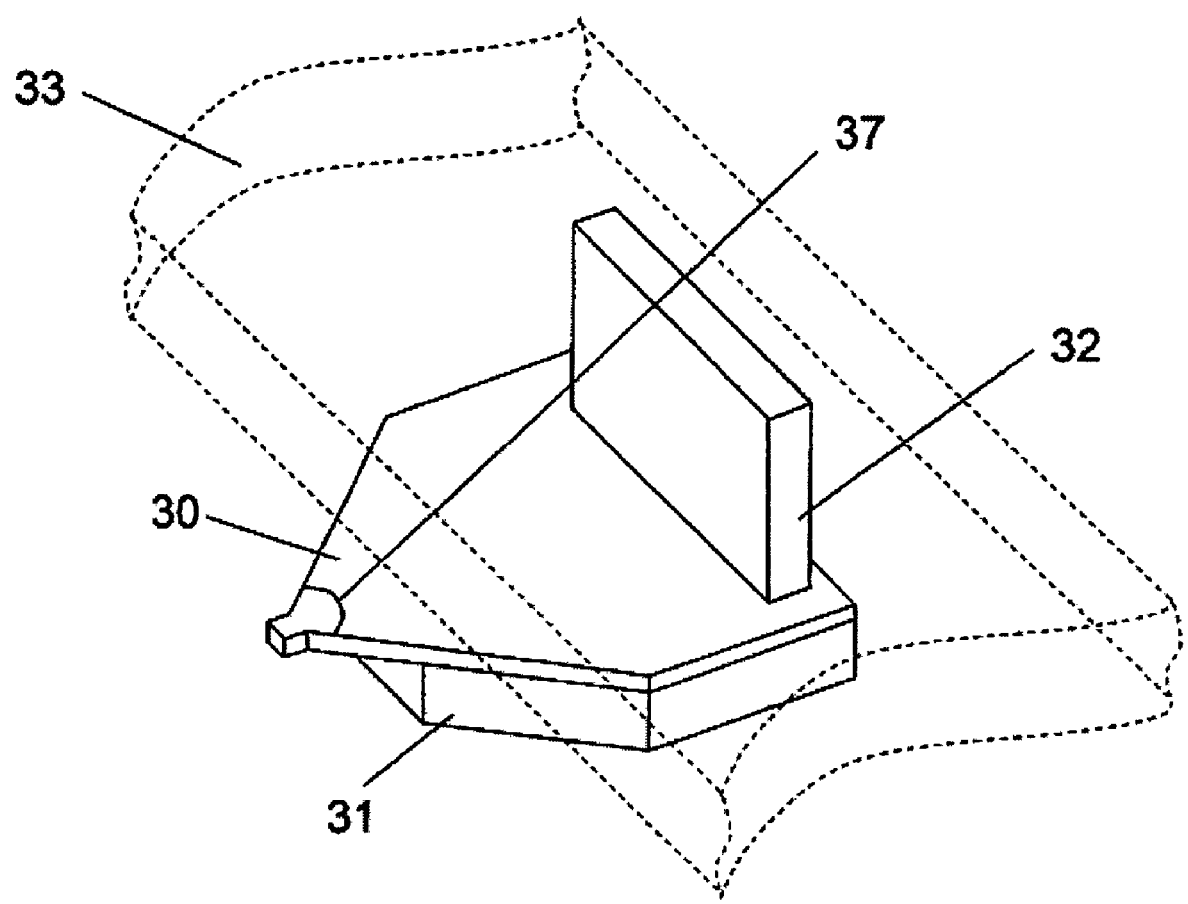
FIG. 7 is a perspective view showing a write element of the perpendicular magnetic recording head according to the embodiment of the invention.

Both the main pole 30, and auxiliary pole 31 are in a plane shape tapered towards an air bearing surface 4 to cause magnetic fluxes to converge (refer to FIG. 7). In order to cause recording magnetic fluxes to be efficiently guided to the tip of the main pole, both the main pole 30 and auxiliary pole 31 are provided with a substantially identical spread angle. As shown in FIG. 7, the spread angle 37 at respective tapered parts thereof is set to about 90°. The spread angle 37 is allowable in a range of about 60 to 120°. This is because a recording field does not undergo large change with the spread angle 37 within the range described. However, the larger the spread angle 37, the more abruptly magnetic fluxes are converged, so that magnetic fluxes are prone to leak at some midpoints in the tapered parts, joining parts between the main pole 30 and auxiliary pole 31, and so forth, thereby raising the risk of recorded information being erased in, for example, the case where the coercivity of the medium for recording information is small. Hence attention should be given thereto. On the other hand, in the case where the spread angle 37 is small, reluctance at the tip of the head becomes high, so that it becomes difficult to obtain a large recording field. In consideration of all those as described, the spread angle 37 is preferably set to around 90°.

With the present embodiment, the auxiliary pole 31 is disposed so as to underlie the main pole 30, however, in the case where magnetic flux convergence efficiency of the main pole 30 is enhanced by setting the thickness of the main pole 30 to a larger thickness, by increasing magnetic permeability thereof, or by some other means, the auxiliary pole 31 may be omitted. When the auxiliary pole 31 is disposed, it is important to cause the auxiliary pole 31 to be recessed by 1 to several μm from the air bearing surface 4 so that a large magnetic field should not inadvertently leak out from the tip thereof. Further, the auxiliary pole 31 is preferably deposited on a side of the main pole 30, adjacent to the substrate 1. That is because even if a magnetic field should leak out, an adverse effect on recorded information can be lessened because the auxiliary pole 31 is on the leading side of the main pole 30 for recording information.

A yoke 32 made of a soft magnetic material, columnar in shape, was formed at a position on the main pole 30, farthest from the air bearing surface 4, so as to be magnetically coupled to the main pole 30. The yoke 32 is in a shape 10 μm in width, 2 μm in depth, and 4 μm in height, and can be formed of $Ni_{80}Fe_{20}$, and so forth. A coil 35 made of a nonmagnetic conductor, such as Cu, and so forth, was formed so as to surround the yoke 32. The number of turns of the coil was 5 turns, and the coil was 3 μm in thickness. An insulator 36 was disposed around the conductors forming the coil 35, thereby preventing electrical short circuit. For the insulator 36, use may be made of an organic insulating material after thermally cured, and an inorganic insulating material, such as $Al_2O_3$, $SiO_2$, and so forth, but it is more preferable to use the inorganic insulating material, such as $Al_2O_3$, $SiO_2$, and so forth, that is stable even through a heat treatment process conducted in a range of about 250 to 300°, necessary when forming a read element 2. When using the organic insulating material after being thermally cured, there can arise the case where evolution of a gas from the organic insulator 36 occurs during a high-temperature process for forming the read element 2, resulting in rupture of a write element 3, and the case where cracks occur to the organic insulator 36, thereby destroying the element, and so on.

Because it is possible to control a phenomenon where metal parts of the magnetic recording head undergo thermal expansion along with rise in ambient temperature to be thereby protruded from the air bearing surface in the case of using $SiO_2$ for the insulator 36, this case is more advantageous as compared with the case of using $Al_2O_3$. This is due to the fact that $SiO_2$ has the effect of deterring expansion of metal on the periphery thereof because of a low thermal expansion coefficient of $SiO_2$. On the other hand, $SiO_2$ is not as high in thermal conductivity as $Al_2O_3$, so that it is difficult to efficiently diffuse heat generated from the coil 35 when recording current is caused to flow into the coil 35, and particularly, with the case of the conventional structure where the write element 3 is deposited on top of the read element 2, there has arisen a problem that an amount of protrusion is large. The phenomenon of protrusion due to the rise in ambient temperature is attributable to the difference in thermal expansion coefficient among constituent materials at a given temperature; however, the phenomenon of protrusion due to the flow of the recording current is attributable mainly to temperature distribution because heat generation parts are at localized spots such as a tapered part at the tip of the main pole, the coil, and so forth. Accordingly, one of the means for solving those problems is to minimize temperature distribution by enhancing heat release efficiency, that is, to render temperature as consistent as possible. With the invention, it was possible to considerably enhance the heat dissipation efficiency of the write element 3 by depositing the same between the read element 2, and the substrate 1, thereby rendering the temperature distribution more uniform, so that a sufficiently small amount of protrusion could be achieved even when using $SiO_2$ for the insulator 36 provided around the coil. As a result, it has become possible to deter protrusion of the head both in the case of the ambient temperature rising and in the case of the flow of the recording current occurring.

Planarization treatment was applied to the upper face of the insulator 36 around the coil 35, and a return pole 33 on the order of 2 μm in thickness was formed on the insulator 36. Use can be made of $Ni_{80}Fe_{20}$, and so forth, superior in soft magnetic property such as coercivity; however, $Fe_{55}Ni_{45}$ low in thermal expansion coefficient is preferably used in order to deter protrusion of the magnetic pole due the ambient temperature. The return pole 33 had a depth 15 μm from the air bearing surface 4. In order to avoid an effect of asperities on the write element 3, due to the structure thereof, stepped parts thereof were once filled up with an insulating material such as $Al_2O_3$, and planarization treatment was applied the upper face thereof.

A spacer 12 made of $Al_2O_3$ 0.25 μm thick was deposited on the write element 3, and the read element 2 was further deposited thereon. As the read element 2, use can be made of all types of elements such as the conventional current-in-plane type GMR (CIP-GMR) element, TMR element, current-perpendicular-to-plane type GMR (CPP-GMR) element, and so forth, and the invention has no limitation on selection of the type of the read element. By adopting the most field-proven CIP-GMR element, it is possible to minimize the risk of development. That is because neither the TMR element nor the CPP-GMR element has a sufficient track record of volume production. With the present embodiment, however, with an eye on heat dissipation efficiency as described hereinafter, the magnetic recording head was constructed using the CPP-GMR element. Both a lower shield layer 21 and an upper shield layer 22 were formed of $Ni_{80}Fe_{20}$ material 0.5 μm thick. Both the lower shield layer 21 and upper shield layer 22 had a depth 15 μm from the air bearing surface 4, respectively, as with the case of the main pole 30 and the return pole 33. With smaller thickness, an amount of protrusion of the shield layers, due to ambient temperature, can be better controlled; however, the magnetic domain structure thereof is prone to become unstable due to recording operation, so that there can arise a problem with stability in read output. The thickness should be set to an optimum value in consideration of the relationship between stability of an output waveform and an amount of the protrusion. More specifically, if the thickness is set in a range of 0.1 to 1 μm, this will produce good results.

In the case of a current-perpendicular-to-plane (CPP) type read sensor as represented by the TMR element, the CPP-GMR element, and so forth, connection of a magnetoresistive sensor 20 with the upper shield layer 22 and the lower shield layer 21, doubling as a pair of electrodes, is in the form of surface contact (a region of sensor width×sensor height), so that heat generated at the sensor 20 can be released at efficiency higher than that in the case of the conventional CIP sensor. With the CIP sensor, a connection region is represented by sensor thickness×sensor height, and normally the sensor thickness is sufficiently smaller than the sensor width or the sensor height, so that the connection of the sensor 20 with the pair of the electrodes is rather approximate to line contact, and consequently, the CIP sensor is inferior in heat dissipation to the CPP sensor. With the head of the conventional construction (refer to FIG. 1) wherein the read element 2 is disposed at a position close to the substrate 1, heat release from the read element 2 used to be sufficiently high because there was available a path of heat release from the read element 2 to the substrate 1 through the lower shield layer 21 in addition to heat release taking place via the electrodes described. Accordingly, with the conventional construction, much difference in heat release between the CIP and the CPP sensor has not been observed. However, with the construction according to the present embodiment, since the write element 3 is inserted between the read element 2 and the substrate 1, heat release to the substrate 1 has been reduced by about 10%. Accordingly, it is preferable to use the CPP sensor high in heat release efficiency through the electrodes.

Although a choice remains to be made as to which priority should be given, the heat release efficiency of the write element 3 or that of the read element 2, power consumption of the write element 3 including one according to the present embodiment is normally not less than ten times as large as that of the read element 2; as described hereunder, the write element 3 larger in heat value is preferably disposed at a position closer to the substrate 1. With the read element according to the present embodiment, electric resistance is 50 Ω, and sensing current is DC 2 mA, so that power consumption is 0.2 W. On the other hand, with the write element, electric resistance is 3 Ω, and write current in square wave is 40 mA op, so that power consumption is 4.8 W. Hence it is apparent that the write element consumes power 24 times more than the read element.

Figure 6:
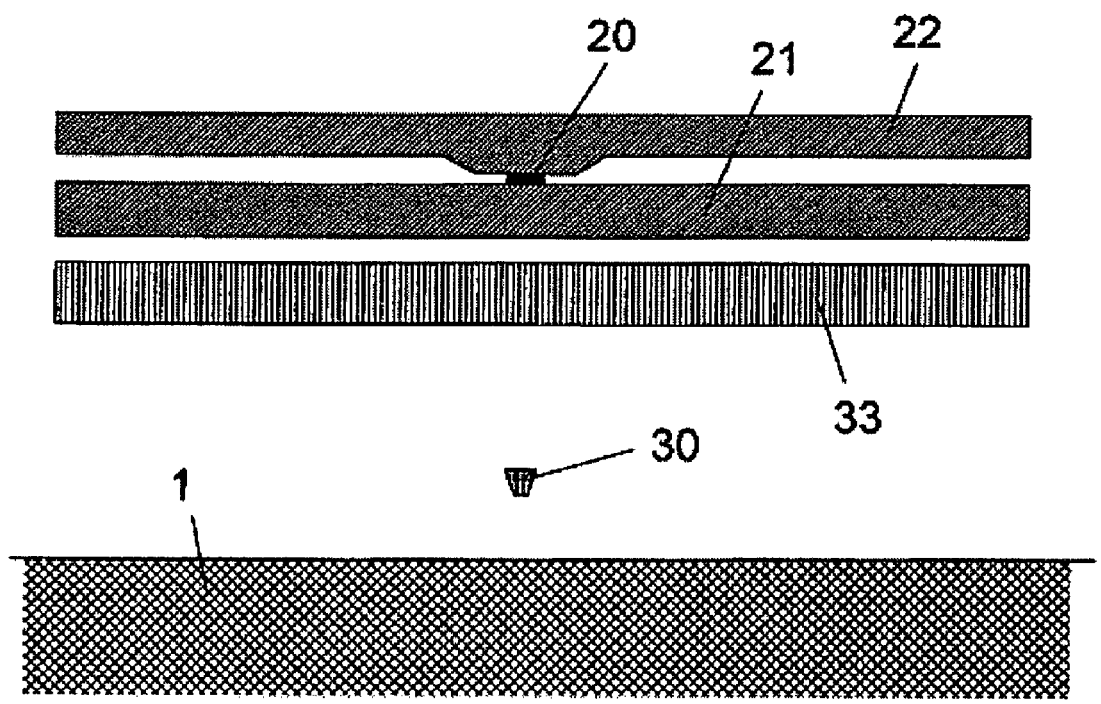
FIG. 6 is a view showing an air bearing surface of the perpendicular magnetic recording head according to the embodiment of the invention.

FIG. 6 is a view showing the air bearing surface of the head according to the present embodiment. The substrate 1, the main pole 30, the return pole 33, the magnetoresistive sensor 20, the lower shield layer 21, the upper shield layer 22, and so forth can be seen from the air bearing surface. The respective widths of the return pole 33, the lower shield layer 21, and the upper shield layer 22, on the air bearing surface, were all about 15 μm so as to be made equal to each other. If there exists a part larger in width than other parts, a magnetic field converges on respective ends of the widest layer when an external magnetic field is applied. Accordingly, the three layers described were rendered substantially equal to each other so that information recorded in the medium should not be erased at the respective ends thereof.

A distance between the upper shield layer 22 and the lower shield layer 21 is set such that the distance is narrower at the central part thereof where the magnetoresistive sensor 20 is present, but is wider at parts thereof, away from the central part. The distance at the central part is set to a value as narrow as about 50 to 100 nm in order to enhance read resolution of the read element, however, spacing at other parts is often set wider in order to prevent electric short circuit from occurring between the two layers, and to reduce capacitance developed between the two layers. For the sake of easiness in fabrication, the upper shield layer 22 is normally provided with a stepped part as shown in FIG. 6 instead of being formed in a flat shape. In such a case, the magnetic domain structure of the upper shield layer 22 is often disturbed with the stepped part acting as a starting point, and in the case of the head of the conventional structure where the write element 3 was disposed over the read element 2 (refer to FIG. 1), since the upper shield layer 22 with an unstable magnetic domain structure was close to the write element 3, the magnetic domain structure of the upper shield layer 22 was prone to become unstable during write operation, having created one of causes for instability in read waveform. In contrast, with the structure according to the present embodiment, the upper shield layer 22 with the stepped part is disposed at a position away from the write element 3, and it is the lower shield layer 21 in a flat shape, having a stable magnetic domain structure, that is positioned close to the write element 3. Accordingly, the present embodiment is advantageous in that the magnetic domain structure of the shield layer is stable even when write operation is repeated, thereby enabling variation in read waveform to be controlled so as to be small.

FIG. 7 is a perspective view showing the write element of the head according to the present embodiment. However, the coil 35 is not shown in the figure. The head was formed by depositing the auxiliary pole 31, the main pole 30, the yoke 32, and the return pole 33 in that order from the side of the substrate 1 (the underside). As shown in the figure, both the main pole 30 and auxiliary pole 31 have the respective tapered parts with substantially the same spread angle to cause recording magnetic fluxes to effectively converge. Meanwhile, the return pole 33 does not have a structure for causing recording magnetic fluxes to converge.

Figure 1:
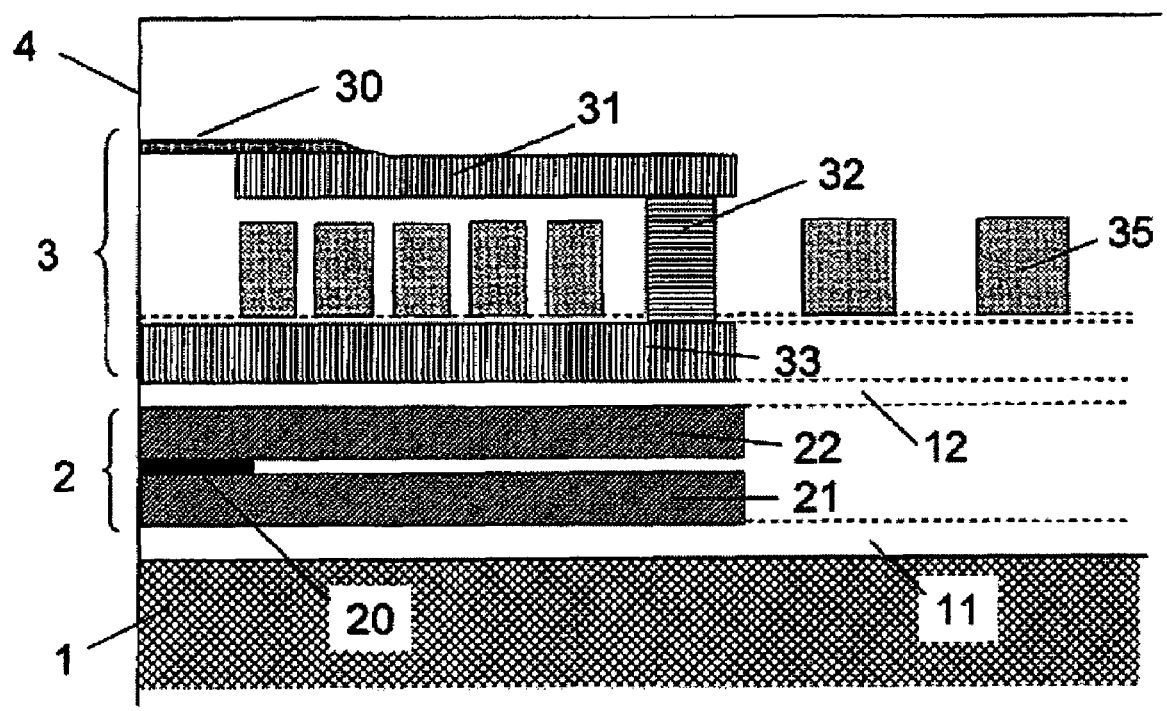
FIG. 1 is a sectional view showing a conventional perpendicular magnetic recording head.
Figure 2:
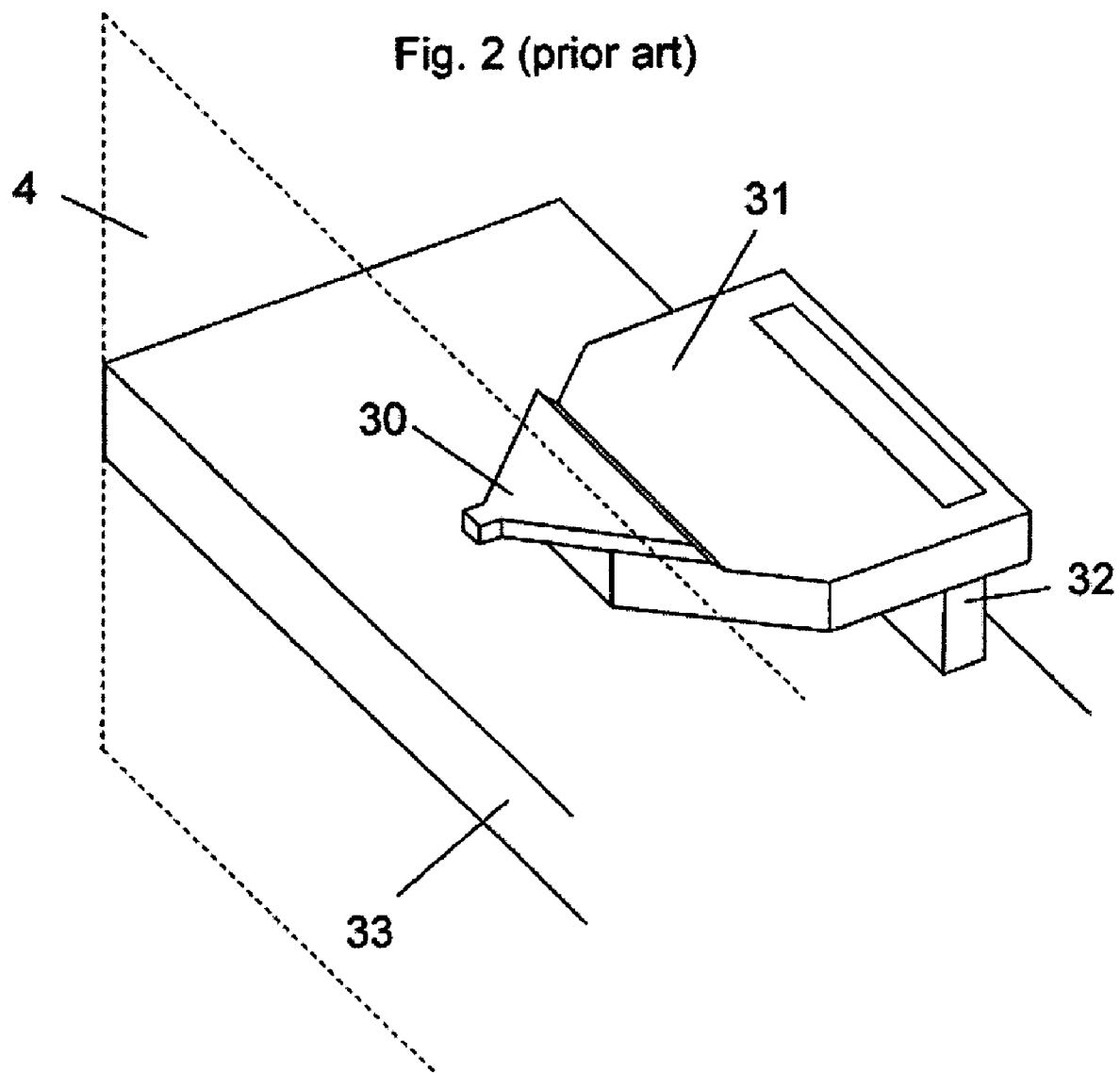
FIG. 2 is a perspective view showing a write element of the conventional perpendicular magnetic recording head.
Figure 3:
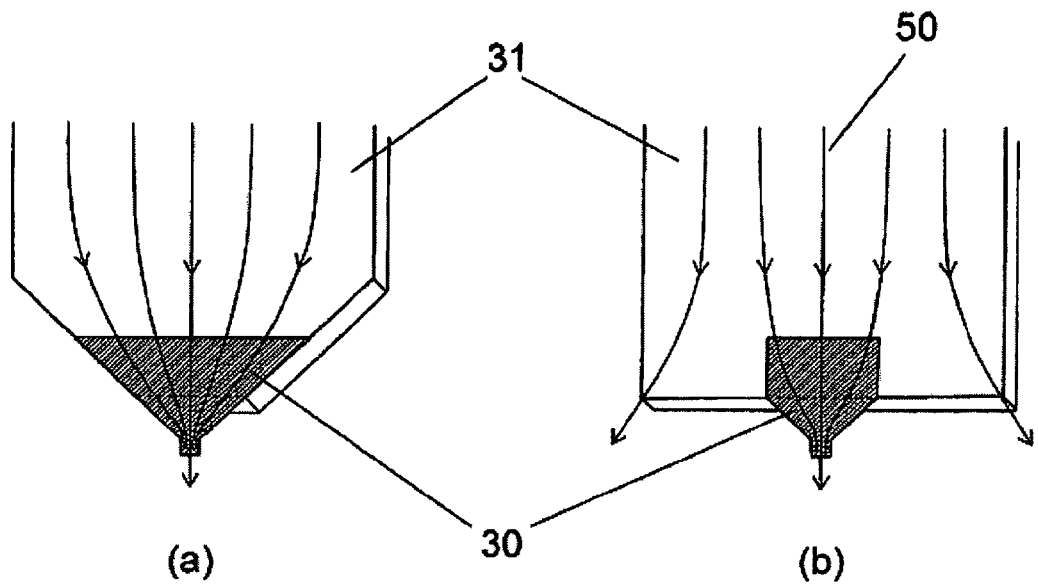
FIG. 3 is a top view schematically showing the write element of the conventional perpendicular magnetic recording head.
Figure 4:
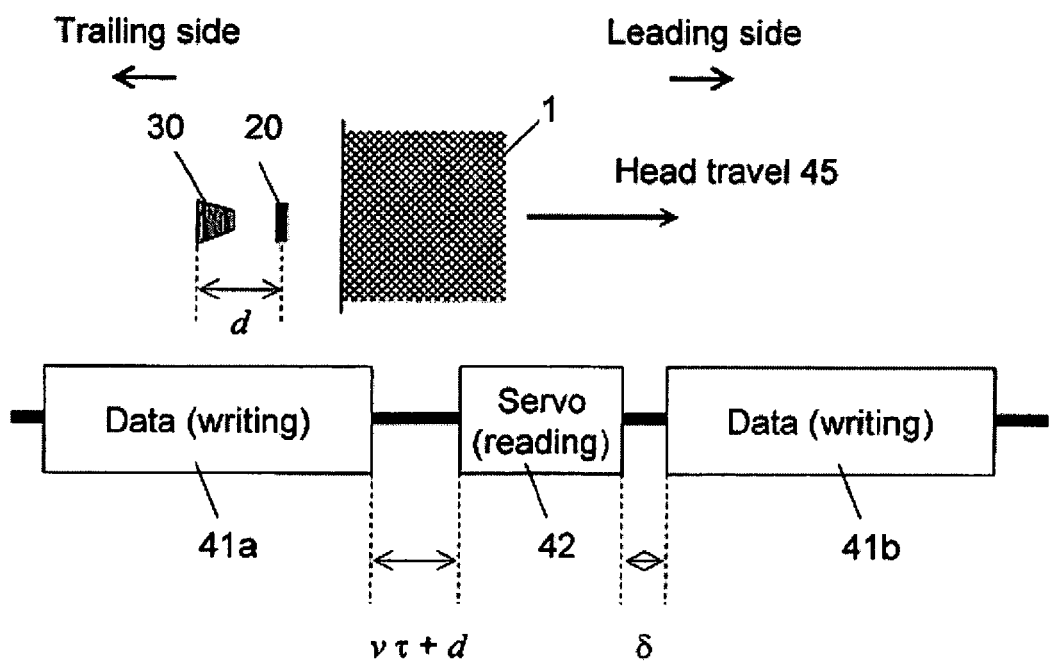
FIG. 4 is a schematic illustration showing a positional relationship between the magnetic recording head of a conventional perpendicular magnetic recording drive, and information recorded in the magnetic disk thereof.
Figure 8:
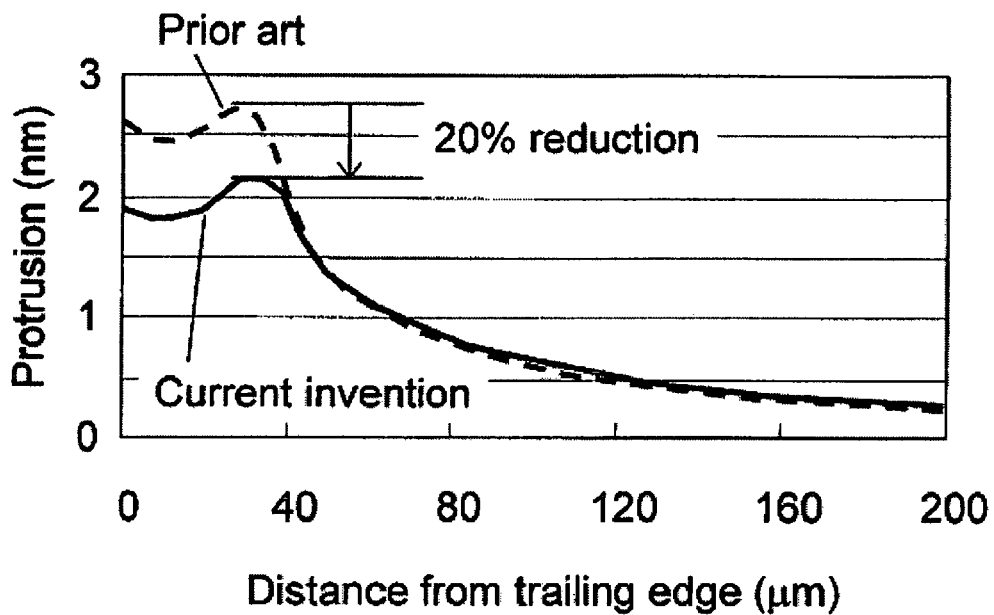
FIG. 8 is a view showing comparison in amount of magnetic pole protrusion between the perpendicular magnetic recording head according to the invention, and the conventional perpendicular magnetic recording head.

FIG. 8 is a view showing comparison of various amounts of magnetic pole protrusion due to the flow of recording current. The vertical axis indicates amounts of protrusion, and the horizontal axis positions of the head. The amount of protrusion for the conventional head shown in FIG. 1 is indicated by a broken line, and the amount of protrusion for the head according to the present embodiment, shown in FIG. 5, is indicated by a solid line. It was confirmed that the amount of protrusion according to invention was controlled by 20 nm, that is, by a large value equivalent to about 20% in comparison with the conventional amount of protrusion. Such a reduction by 20% cannot easily be obtained by other means. For example, in the past when the underlayer 11 used to be very thick, it was possible to obtain reduction of 20% by reducing thickness thereof from 8 μm to 1 μm. However, since the underlayer 11 at present is already as thin as about 1 μm, it can be said that the structure according to the present embodiment is quite effective. That is because the write element 3 large in heat value was disposed in immediate proximity of the substrate 1, so that heat release efficiency was enhanced, and the rise in temperature was checked so as to be lower by 15%. It is well known that time before occurrence of a failure, such as a break of the coil, and so forth, is shortened exponentially accompanying the rise in temperature. It was confirmed that the head according to the invention is a highly reliable head long in service life, capable of checking the amount of protrusion of the magnetic pole to a low value, and also, checking the probability of the failure, such as a break of the coil, and so forth.

Embodiment 2

Figure 19:
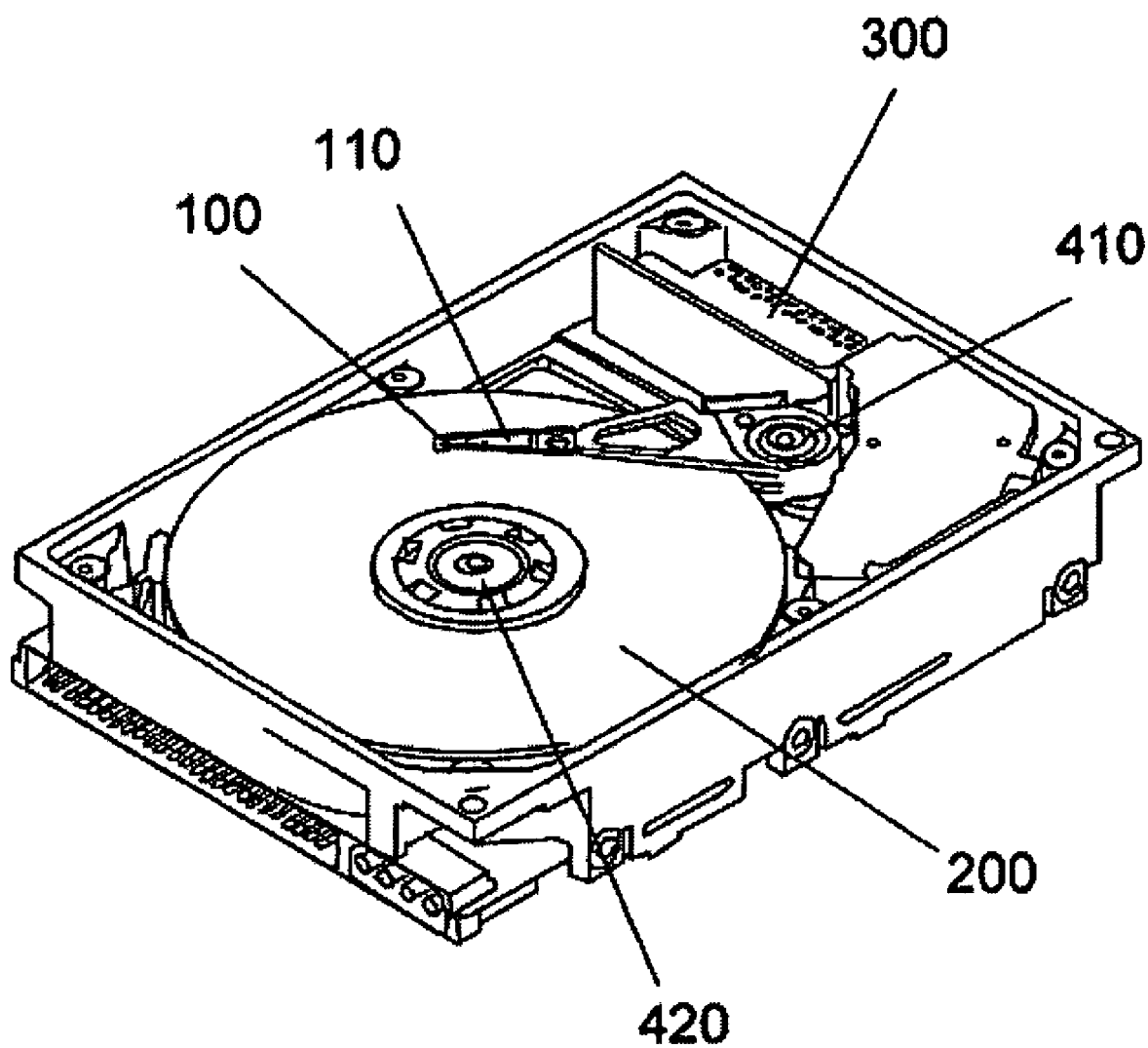
FIG. 19 is a perspective view of one embodiment of a perpendicular magnetic disk drive according to the invention.

FIG. 19 is a schematic representation of a perpendicular magnetic disk drive, which is one of a perpendicular magnetic recording drive according to the invention. The perpendicular magnetic disk drive has a magnetic recording disk 200 as a medium for magnetically recording information, a mechanism 420 for rotating the magnetic recording disk 200, a magnetic recording head 100 for recording signals in the magnetic recording disk 200, and reproducing the signals therefrom, a suspension 110 made of an elastic body, for supporting the magnetic recording head 100, a mechanism 410 for executing positioning of the magnetic recording head 100, a circuit 300 for processing write/read signals, and so forth.

Figure 20:
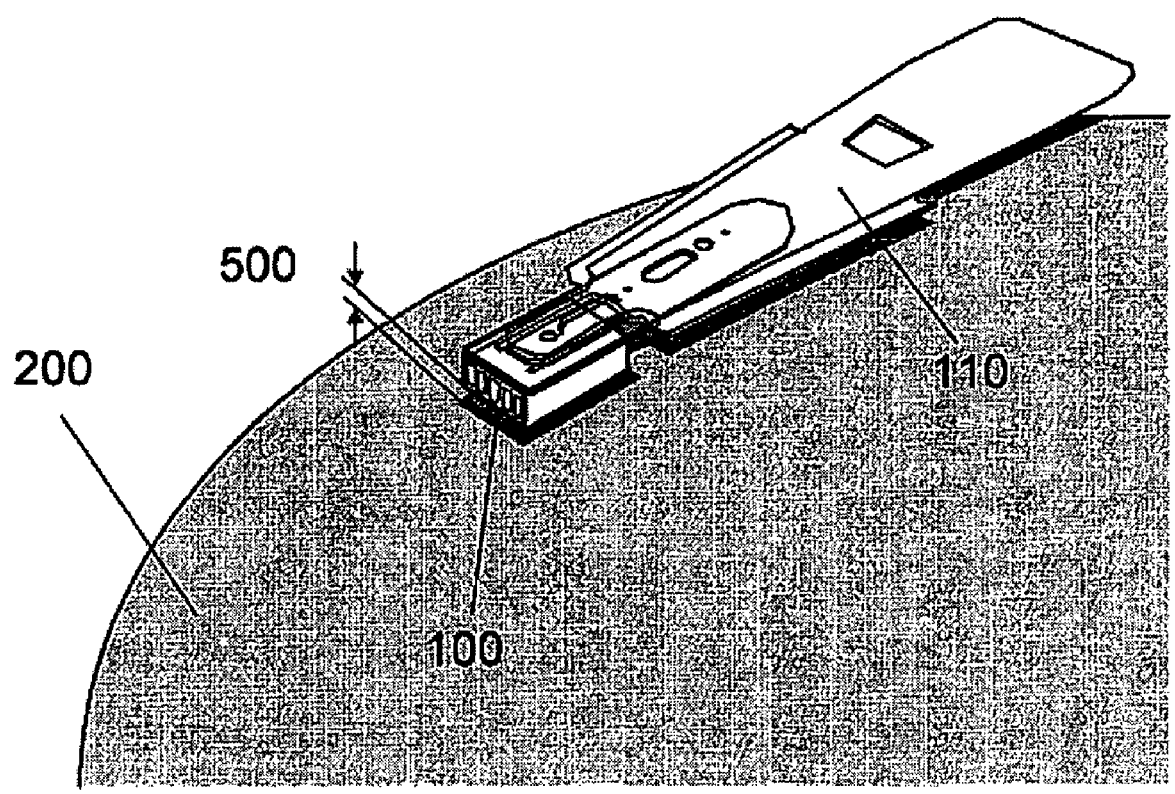
FIG. 20 is a perspective view showing a relationship between a magnetic recording head and a magnetic disk with respect to the perpendicular magnetic disk drive according to one embodiment of the invention.

FIG. 20 is an enlarged view showing a part of the magnetic disk drive, in the vicinity of the magnetic recording head 100. A distance 500 between the air bearing surface of the magnetic recording head 100, and the surface of the magnetic recording disk 200 was set to 5 nm. The distance is implemented by balance between buoyancy obtained due to rotation of the magnetic recording disk 200, and push-down force exerted by the suspension 110. With the magnetic recording head 100 shown in the figure, the substrate is provided on the left-hand side thereof, and the write element and the read element were deposited in that order over the substrate, toward the right-forward side, thereby having formed the magnetic recording head 100. The direction of rotation of the magnetic recording disk 200 is set counterclockwise so that the write element is on the leading side and the read element is on the trailing side. The number of revolutions per minute is 10,000 rpm.

Figure 21:
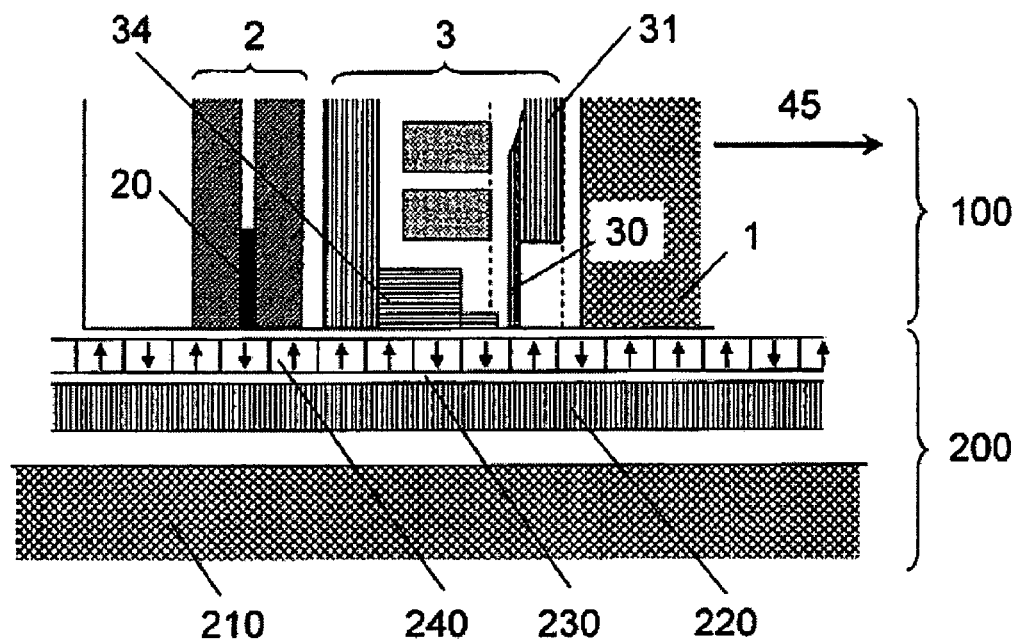
FIG. 21 is a sectional view showing a relationship between a magnetic recording head and a magnetic disk with respect to the perpendicular magnetic disk drive according to one embodiment of the invention.

As shown in FIG. 21, the magnetic recording disk 200 has a soft magnetic underlayer 220 made of CoTaZr, and so forth, about 100 nm thick, formed over a substrate 210, an intermediate layer 230 made of Ru, and so forth, about 10 mn thick, deposited on the soft magnetic underlayer 220, and a hard magnetic film 240 made of a mixture of CoPt and oxides, such as $SiO_2$, and so forth, about 10 to 20 nm thick, the direction of easy magnetization thereof being a direction perpendicular to the substrate. The magnetic recording head 100 travels in a direction 45 relative to the magnetic recording disk 200 while keeping the distance from the magnetic recording disk 200 at 5 nm, and records information by directing a magnetization direction of the hard magnetic film 240 in a desired direction by use of a recording magnetic field occurring from the main pole 30. Further, information recorded is reproduced by the magnetoresistive sensor 20 sensing a magnetic field leaking out of the hard magnetic film 240. The soft magnetic underlayer 220 acts so as to more efficiently apply the recording magnetic field to the hard magnetic film 240, and also acts at the time of reproduction so as to more efficiently guide the magnetic field as leaked to the magnetoresistive sensor 20. Both these actions are based on the principle well known as the imaging effect.

Figure 9:
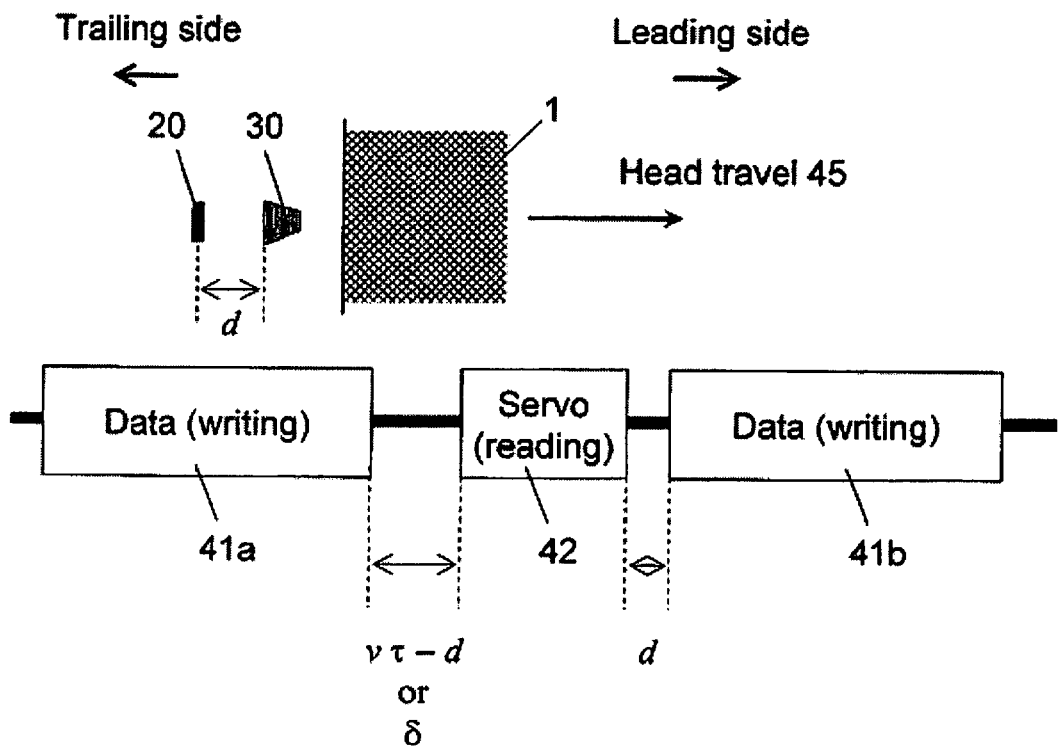
FIG. 9 is a schematic illustration showing a positional relationship between the magnetic recording head and information recorded in the magnetic disk with respect to a perpendicular magnetic disk drive according to another embodiment of the invention.

FIG. 9 is a view showing a relationship between the magnetic recording head, and information recorded in the magnetic recording disk with respect to the magnetic disk drive. As described in the foregoing, the magnetic recording disk travels leftward, that is, the magnetic recording head travels relatively rightward (the arrow 45) at the linear velocity v, and the main pole 30 is disposed on the leading side while the magnetoresistive sensor 20 is disposed on the trailing side. The distance between the magnetoresistive sensor 20 and the trailing end of the main pole 30 is d.

When recording information, the information is recorded in a writing region 41a by use of the main pole 30, and subsequently, a servo signal disposed in a servo region 42 is reproduced in order to align a head position with a desired position with high precision. At this point in time, owing to the limitation of an electric circuit (R/W-IC) for generating recording current and amplify a read signal, latency time r from after recording operation until the start of reproducing operation is required. That is because a high frequency current at a large value is generated at the time of the recording operation, and it takes time for the circuit to be sufficiently stabilized even after the current is cut off. Since the head travels at the linear velocity v, it is obvious that a distance $v\tau$ is required between the writing region 41a, and the servo region 42. In contrast to the conventional case, however, with the present invention, because the magnetoresistive sensor 20 is disposed towards the tailing side by a distance d from the main pole 30, it is obvious that a distance between the writing region 41a and the servo region 42 need be actually only $(v\tau-d)$. Nevertheless, in case that this value is smaller than the distance δ representing variation in rotation of the medium, there is the risk of erasing information at the leading end of the servo region 42 by error. In order to avoid the risk, there is attached a condition that the value be not less than δ. That is, the distance between the writing region 41a, and the servo region 42 is either $(v\tau-d)$, or δ, whichever greater.

In the case of recording data continuously after reproducing the servo signal, the electric circuit (R/W-IC) can immediately start recording operation, however, as the main pole 30 is on the leading side of the magnetoresistive sensor 20, the writing region 41b needs to start from a position away by the distance d from the servo region 42.

From the above, with the structure according to the present embodiment, the linkage region existing between the information-writing region 41, and the servo region 42 needs to have a total length of $v\tau$, or only $(\delta+d)$ if $(v\tau-d)<\delta$. Those values are always smaller in comparison with $(v\tau+d+\delta)$ as in the conventional case, proving that useless space can be reduced. Thus, by setting the disposition of a perpendicular magnetic recording head, and the direction of rotation or traveling of a perpendicular magnetic recording medium such that the main pole side of the perpendicular magnetic recording head is on the leading side, and the read element side thereof is on the trailing side, a ratio of information regions recorded in the medium can be increased.

Now, further explanation is given by use of specific numerical values. With the present embodiment, since the same magnetic recording head as shown in Embodiment 1 is used, d is 7 µm. Further as the number of revolutions of the magnetic recording disk is 10,000 rpm, the linear velocity v at a position of 38 mm in radius is 40 m/s. The recovery time r of the electric circuit (R/W-IC) is 300 ns, and the margin δ for variation in the rotation of the medium is 1 µm. With the disk drive of the conventional structure, there used to be a loss of 20 µm corresponding to $(v\tau+d+\delta)$ for every section. With the adoption of the structure according to the present embodiment, it was possible to reduce a loss to 12 µm. That is, more control of the loss by 8 µm, representing 20% of the loss in the conventional case was implemented.

Furthermore, as an amount of protrusion of the head was controlled by 0.5 nm against a distance 5 nm between the head and disk, the magnetic disk drive, it is possible to provide the magnetic disk drive with higher reliability, or the magnetic disk drive with a low flying height, and a high areal recording density.

Embodiment 3

Figure 10:
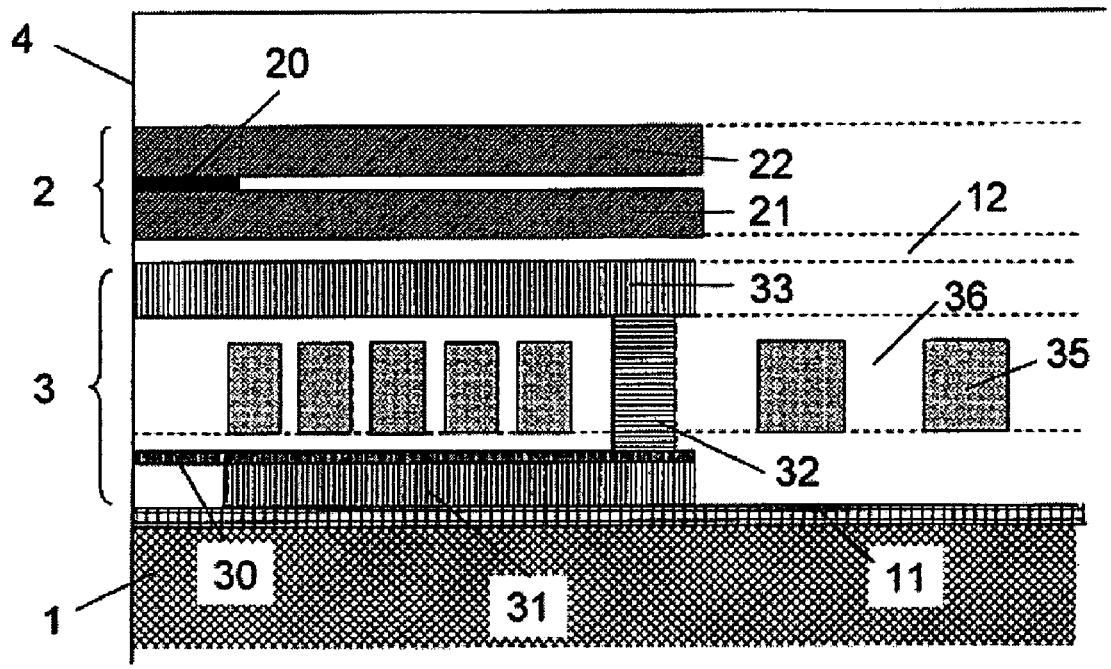
FIG. 10 is a sectional view showing still another embodiment of a perpendicular magnetic recording head according to the invention.

With Embodiment 1, the underlayer 11 disposed between the substrate 1, and the auxiliary pole 31 was made of $Al_2O_3$, but the same can be made up of a metal or a stacked film composed of a metal and an insulator such as $Al_2O_3$, and so forth. FIG. 10 shows a section thereof. The higher a ratio of a metal in the constituent material of the underlayer 11, the more advantageous the underlayer 11 is from the viewpoint of heat conduction. However, for example, in the case of the underlayer 11 having large bumps and dips, there can be times when it is not possible to reset so as to sufficiently lessen the effect thereof. This can be easily determined since there arise problems that coercivity, and so forth with respect to the auxiliary pole 31 and the main pole 30 are not sufficiently reduced. In such a case, an insulation film, made of $Al_2O_3$, and so forth, is formed to a sufficient thickness on the substrate 1, and is polished to a desired thickness while applying planarization treatment by CMP or the like, whereupon a metal film is preferably formed thereon.

Cr, Ta, Ni—Cr alloy, and so forth are preferable as metal for use in the underlayer 11, and by use of those metals singly or in a stacked form, it is possible to obtain an underlayer not only superior in adhesiveness and corrosion resistance, but also capable of fully getting soft magnetic properties of the auxiliary pole 31, and the main pole 30, to be formed thereon, respectively.

Figure 11:
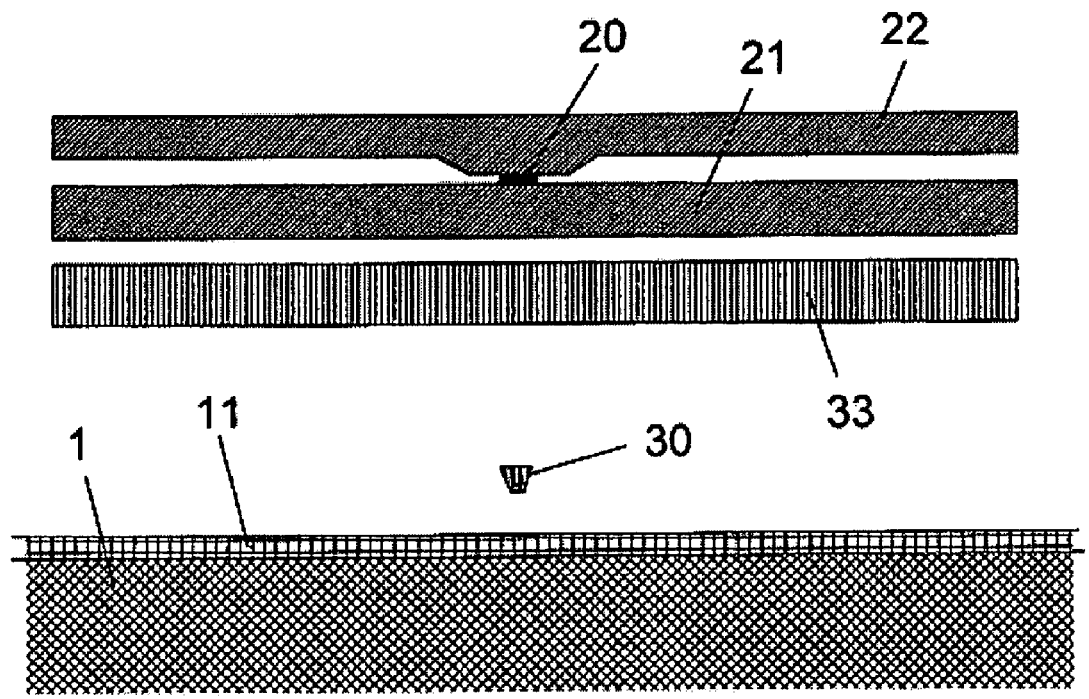
FIG. 11 is a view showing an air bearing surface of the perpendicular magnetic recording head according to the above embodiment of the invention.

FIG. 11 is a view showing the air bearing surface of the head according to the present embodiment. With the conventional structure, only an insulating material such as $Al_2O_3$, and so forth, besides the main pole 30, is generally observed between the substrate 1, and the return pole 33. However, with the present embodiment, the underlayer 11 containing metal can be seen between the substrate 1, and the main pole 30.

Embodiment 4

Figure 12:
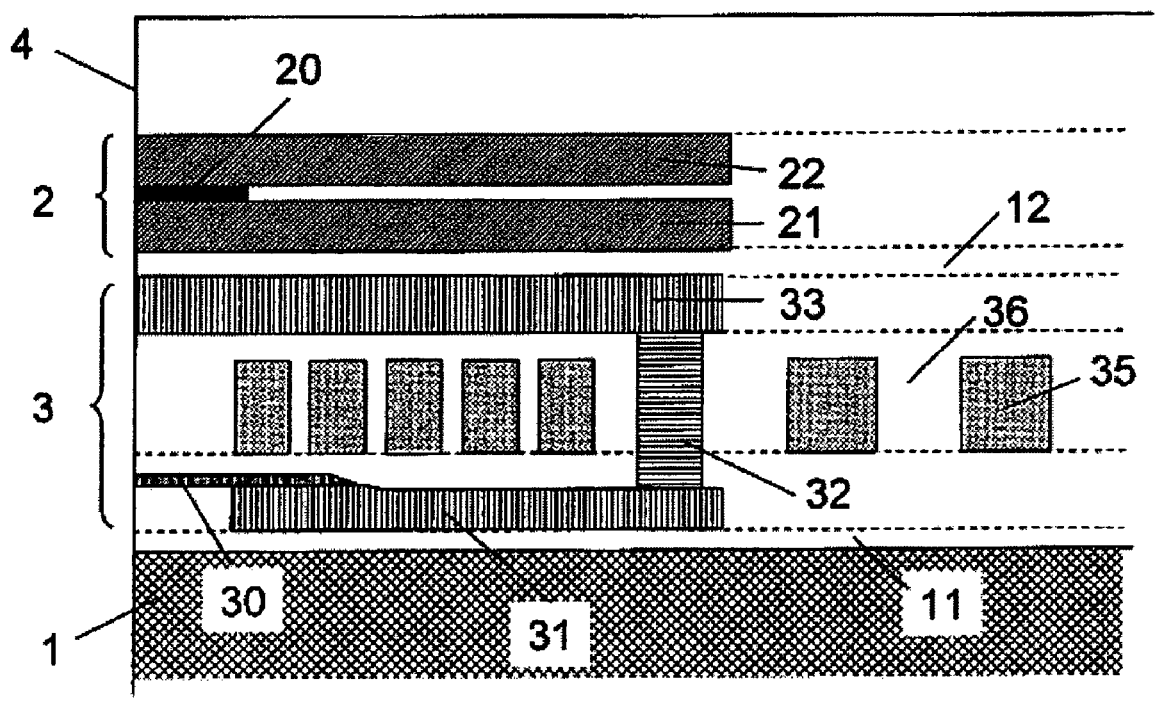
FIG. 12 is a sectional view showing a further embodiment of a perpendicular magnetic recording head according to the invention.

With the embodiments described hereinbefore, the respective depths of the main pole 30, and the auxiliary pole 31, from the air bearing surface 4, have been made equal to each other. In this case, if the width of the main pole 30 is reduced to about 100 nm or less in order to enhance the areal recording density of the magnetic recording drive, in particular, undesirable remanent magnetization components remain in the main pole 30, posing the risk of inadvertently erasing information recorded in the medium. This can be deterred by the main pole 30 made up of a multilayer film, but if the number of stacked layers is large, write performance can be sacrificed, and further, a fabrication process becomes complex. It is effective in solving such problems to render the depth of a main pole 30 smaller that that of an auxiliary pole 31 as in FIG. 12 showing the sectional thereof. With the present embodiment, an auxiliary pole film was deposited to be formed into a shape of a desired size, and subsequently, a main pole film was formed thereon. The main pole film was further formed by milling so as to in a desired size. In order to ensure no milling leftover remaining across a wafer, slight over-etching was applied to the surface of a rear end portion of an auxiliary pole 31, that is, a portion where a main pole 30 is abraded.

Figure 13:
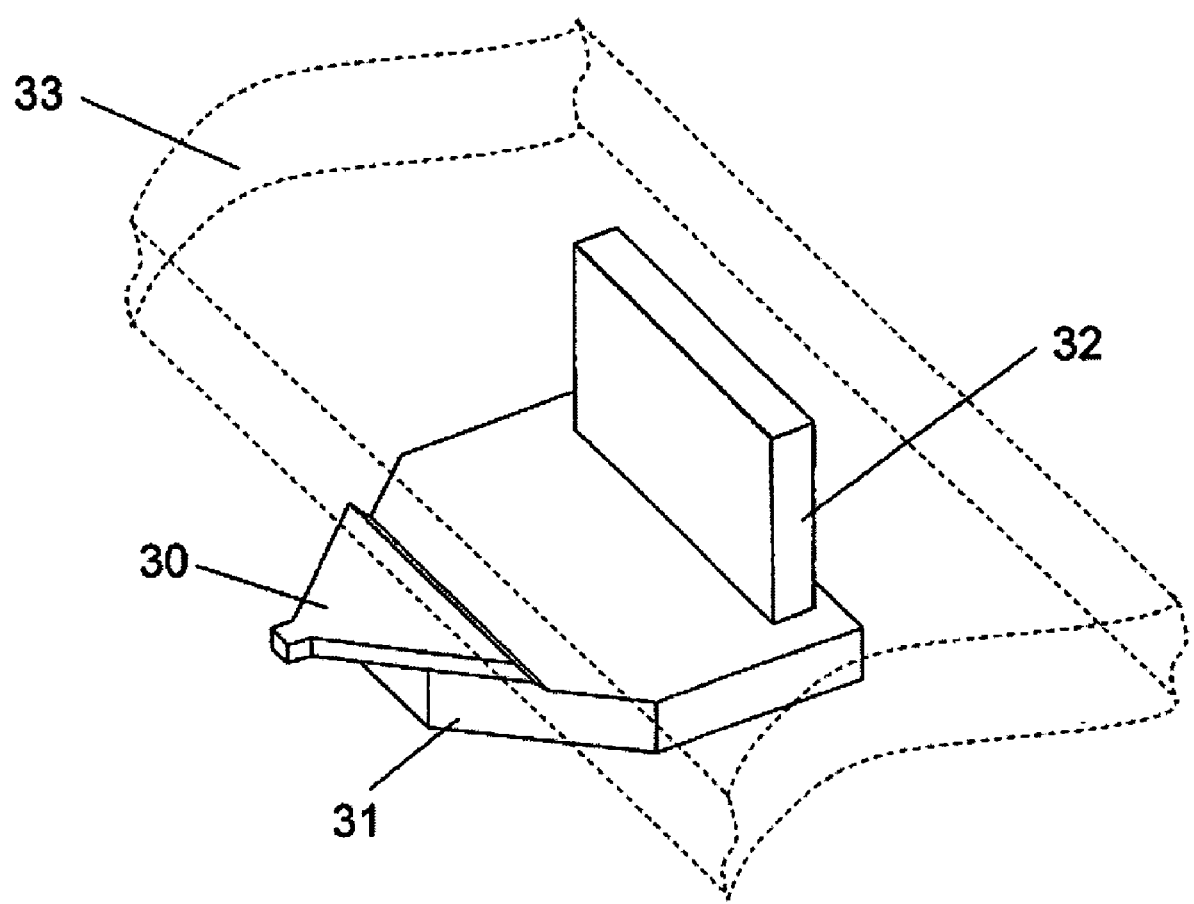
FIG. 13 is a perspective view showing a write element of the perpendicular magnetic recording head according to the above embodiment of the invention.

FIG. 13 is a perspective view showing a write element. However, coil 35 is not shown in the figure. In order to enable recording magnetic fluxes to efficiently propagate from the auxiliary pole 31 to the main pole 30 smaller in depth, an overlapping portion of both the poles is preferably set to the order of about 2 to 3 μm in depth. If the overlapping portion is too small in depth, the magnetic fluxes do not efficiently flow, resulting in deterioration in write performance. On the other hand, if the overlapping portion is too large in depth, the depth of the main pole 30 becomes larger, thereby posing the risk of failing to deter remanent magnetization so as to be sufficiently low. The depth of the overlapping portion should be set with care taking into consideration balance between both cases.

Embodiment 5

Figure 14:
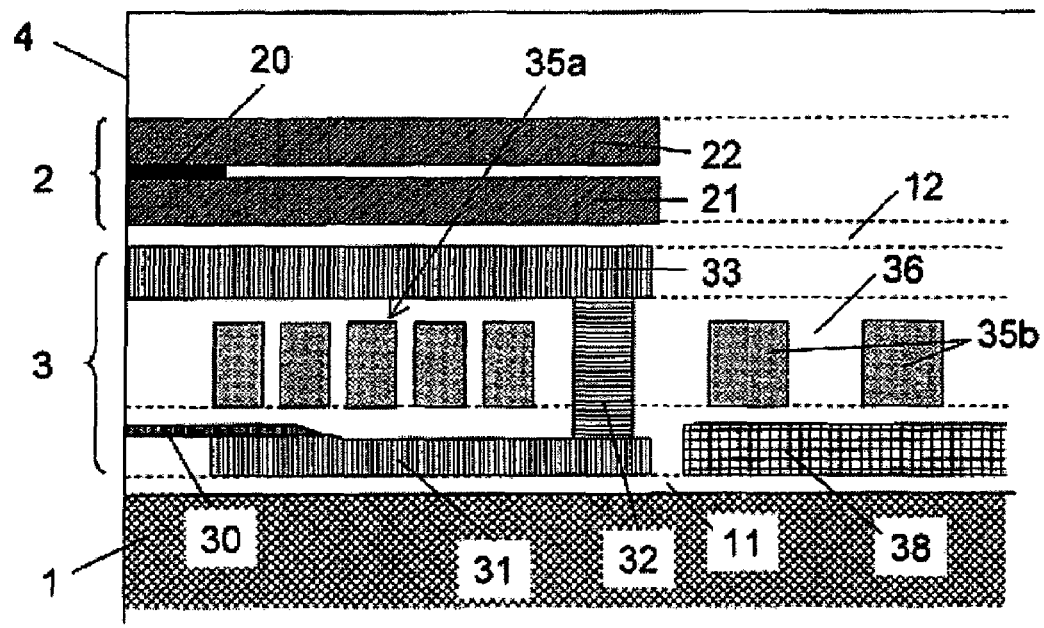
FIG. 14 is a sectional view showing a further embodiment of a perpendicular magnetic recording head according to the invention.

In order to more efficiently release heat, generated from coils when recording current is flowing, to a substrate, in part of the head, without the main pole 30, and the auxiliary pole 31, located thereunder, such as a part thereof where coil 35b as portions of the coil 35, disposed behind the yoke 32, a heat diffusion layer 38 made of a substance high in heat conduction, such as a metal, may be disposed between the substrate 1 and the coil 35b as shown in FIG. 14. As spacing between the coil 35b, and the substrate 1, used to be provided with an insulating material, such as $Al_2O_3$, and so forth, in the conventional case, is now provided with a metal and so forth, heat release can be more efficiently attained. In order to simplify a fabrication process, the heat diffusion layer 38 and the auxiliary pole 31 may be concurrently formed of a soft magnetic material by, for example, a single operation, in which case, however, the soft magnetic material, disposed in the part of the heat diffusion layer 38, acts as a magnetic antenna, so that the head fabricated becomes very susceptible to a floating magnetic field. This can be avoided by devising a suitable shape for the heat diffusion layer 38, but the heat diffusion layer 38 is preferably formed of a nonmagnetic metal.

In the case of forming the heat diffusion layer 38 out of the nonmagnetic metal, fabrication is implemented by taking somewhat complex steps of first depositing material for the auxiliary pole 31 by frame plating or sputtering, protecting a portion of the auxiliary pole material, where the auxiliary pole 31 is to be formed, with a mask, subsequently removing unnecessary portions thereof by milling or wet etching, subsequently depositing material for the heat diffusion layer 38 across the surface, and thereafter, removing unnecessary portions.

In reviewing the description as above, when a structure according to the present embodiment, where the heat diffusion layer 38 is disposed between the coil 35b and the substrate 1 is combined with the structure of the present invention, having the read element 2 on the upper side of the write element 3, but not between the write element 3 and the substrate 1, a practical structure easy to fabricate has finally been implemented. With the conventional structure where the read element 2 is disposed between the write element 3 and the substrate 1, the coil 35 are far apart in distance from the substrate 1 as is evident from FIG. 1, so that the heat diffusion layer 38 needs to be formed to a large thickness, that is, the fabrication process becomes very complex such as needs for forming a thick nonmagnetic metal layer after deep grooving, dividing the thick nonmagnetic metal layer into fine layers to be subsequently stacked, or so forth. A pair of wires (not shown) connected to the read element 2 are routed behind (on the right-hand side in the figure) the read element 2, and are connected to electric pads disposed on the uppermost surface of the magnetic recording head by applying wiring in a columnar form. Accordingly, when newly disposing the heat diffusion layer 38, there used to be the needs for avoiding interference with a layout of the wires connected to the read element 2, having caused much difficulty. However, with the structure of the present invention, where the write element 3 is disposed close to the substrate 1, there is no need for caring about the wires connected to the read element 2, and the distance from the write element 3 to the substrate 1 is short, so that the heat diffusion layer 38 can be fabricated with extreme ease.

Embodiment 6

Figure 15:
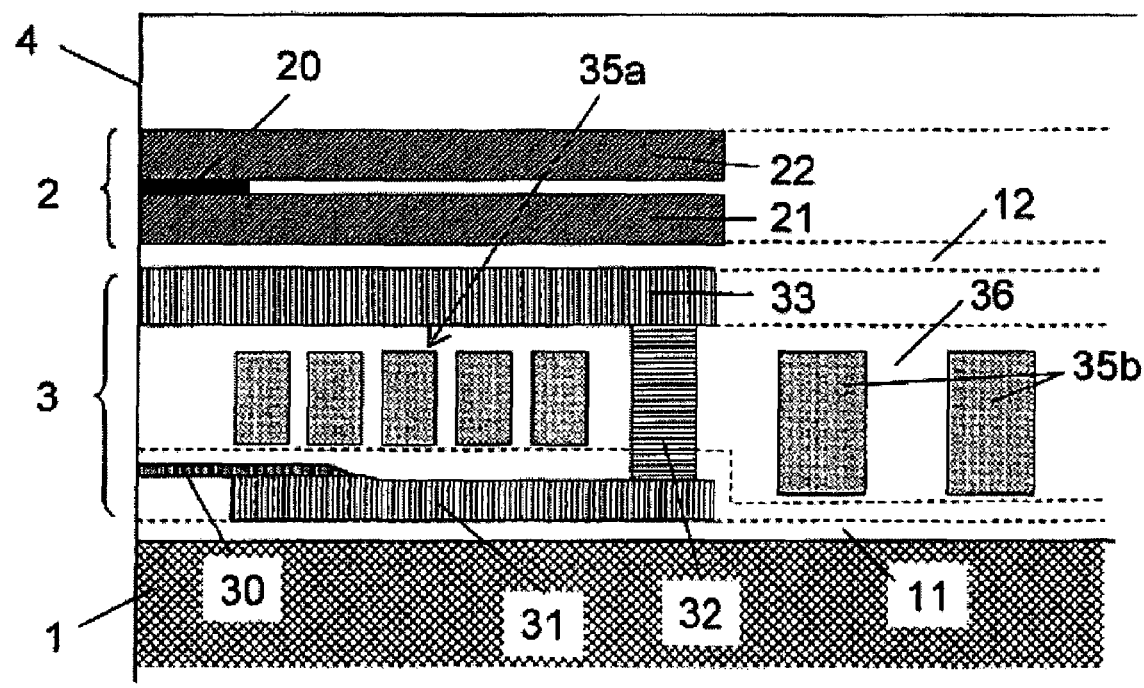
FIG. 15 is a sectional view showing a still further embodiment of a perpendicular magnetic recording head according to the invention.

Another approach for efficiently releasing heat, generated from coils when recording current is flowing, to a substrate is to form a narrower spacing between the coil and the substrate 1 in the part of the head, without the main pole 30, and the auxiliary pole 31, located thereunder, such as the part of the head where the coil 35b as the portions of the coil 35, disposed behind the yoke 32, in comparison with spacing between coil 35a and the substrate 1 in part of the head, having the main pole 30, or the auxiliary pole 31, as shown in FIG. 15. Since the coil 35b as the portions of the coil 35 that is a heat generation part are brought closer to the substrate 1, heat release efficiency can be enhanced.

When forming the insulator 36 around the coil out of $Al_2O_3$, $SiO_2$, and so forth, an insulator is first formed by deposition, grooves are formed in portions thereof, corresponding to the coil, by reactive ion etching, and so forth, a coil forming material, such as Cu, and so forth, is deposited across the surface thereof, and Cu in unnecessary portion of the coil forming material, other than the grooves, is removed by grinding, thereby enabling a desired structure to be formed. With a process as described, in the part of the head where the coil 35b as the portions of the coil 35, disposed behind the yoke 32, are larger in coil pitch and coil width, the grooves are formed to a larger depth than the grooves in the part of the head where the coil 35a is smaller in coil pitch and coil width. That is because a reactive gas or reactive ions are prone to enter with greater ease in the part of the head, larger in coil pitch and coil width, so that etching proceeds sooner. Accordingly, it is possible to form shallower grooves in a part forward of the yoke 32 and deeper grooves in a part behind the yoke 32 by disposing an etching stopper layer at a desired position, so that the coil differing in distance from the substrate 1 can be formed, as shown as shown in FIG. 15.

With conventional structure where the read element 2 is on the substrate side, there is hardly gained any cooling effect such as that in the case of the present embodiment. As described in the preceding embodiment, even if the coil 35b as a portion of the coil is formed by grooving, such grooving cannot be executed to a large depth so that the wiring of the read element 2 should not be damaged. In this case, since the insulating material, such as $Al_2O_3$, and so forth, corresponding to the thickness of the read element 2 remains, there is hardly extra cooling effect. Hence, in order to obtain advantageous effects with the structure according to the present embodiment, it is essential to have the structure of the present invention, where the write element 3 is on the substrate 1 side.

Embodiment 7

With the head according to any of the embodiments described hereinbefore, a wraparound shield layer 34 may be added immediately on the trailing side, that is, on the upper side of the main pole 30 so as to be coupled to the return pole 33. The wraparound shield layer 34 is made of a soft magnetic material such as $Ni_{80}Fe_{20}$, $Fe_{55}Ni_{45}$, and so forth, and has an effect of rendering distribution of the recording magnetic field, occurring from the main pole 30, more steep. As a result, information can be more steeply recorded in the medium, thereby enhancing the areal recording density. In contrast with such an advantageous point, if a part of the wraparound shield layer 34, facing to the main pole 30, is large in area, the recording magnetic fluxes in large quantity leak to the wraparound shield layer 34, thereby causing deterioration in write performance. In order to maintain write performance, the depth of the part of the wraparound shield layer 34, facing to the main pole 30, was set to 50 nm from the air bearing surface 4. The height (film thickness) thereof was about 4 μm. As the depth is very small, there is the risk that variation in property becomes very large if left as it is in case variation in the depth occurs. In order to stabilize property, the wraparound shield layer 34 was comprised of two layers, namely, a portion thereof, facing to the main pole 30, small in depth, and another portion thereof, deposited thereon, larger in depth. Further, the wraparound shield layer 34 can be made up of a multilayer film of not less than 3 layers sequentially increasing in depth along with increase in height, and to the contrary, can be made up of a single layer to simplify a fabrication process.

Figure 16:
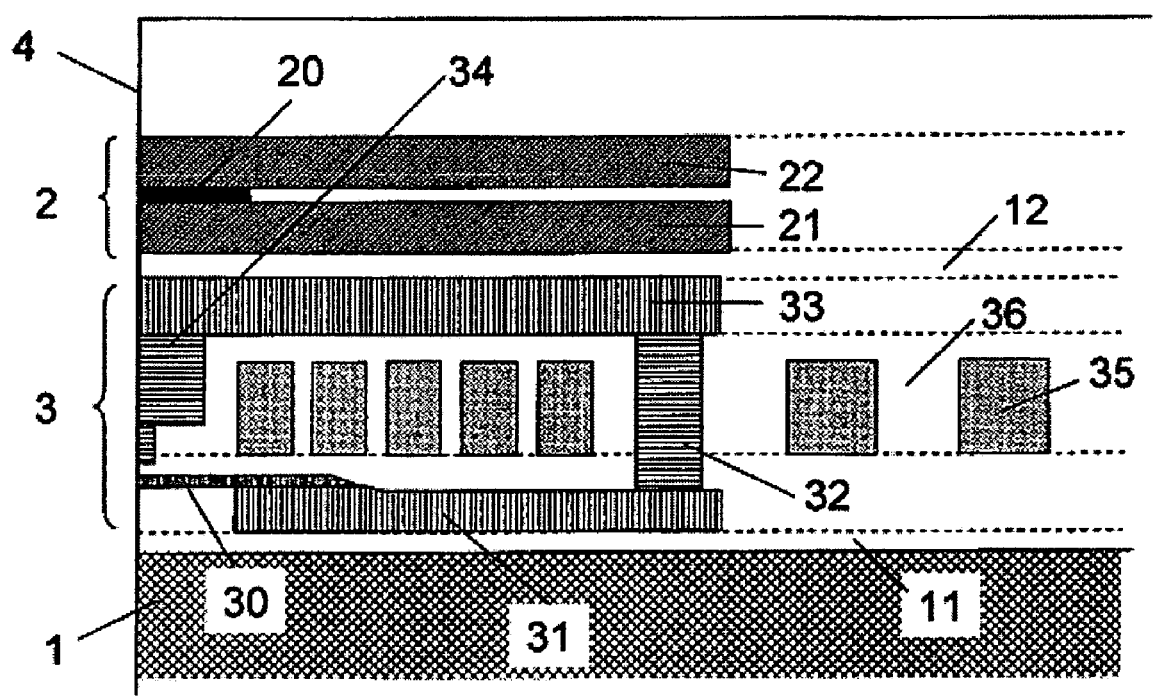
FIG. 16 is a sectional view showing a yet further embodiment of a perpendicular magnetic recording head according to the invention.
Figure 17:
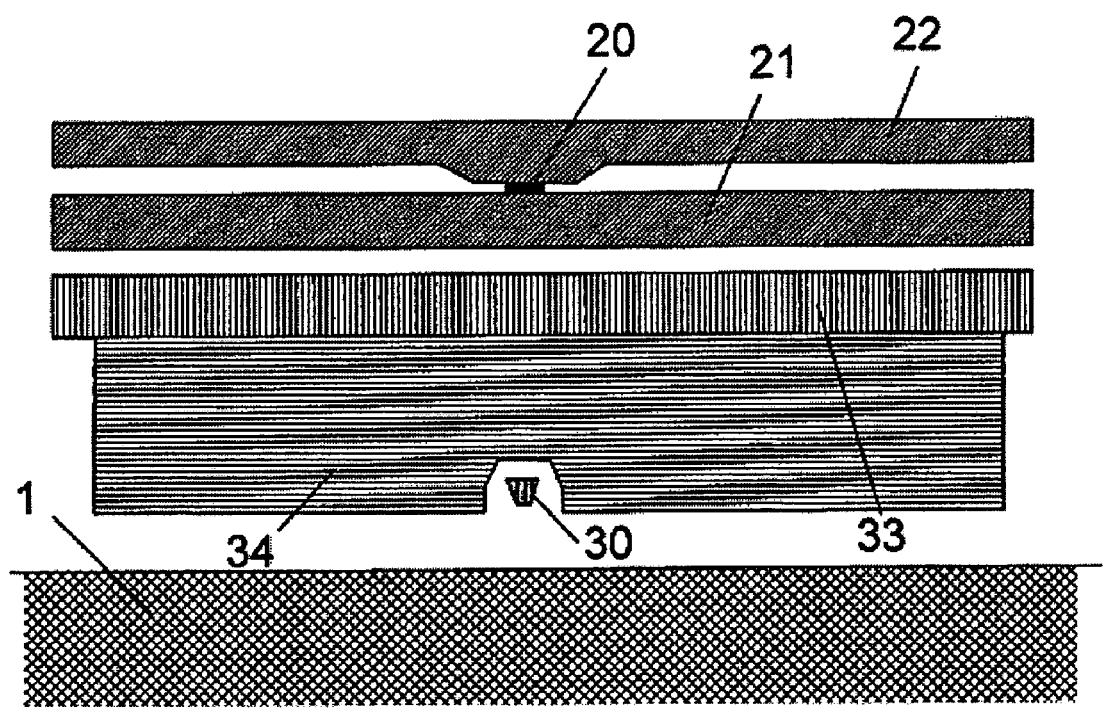
FIG. 17 is a view showing an air bearing surface of the perpendicular magnetic recording head according to the above embodiment of the invention.

FIG. 17 shows the air bearing surface of the head shown in FIG. 16. The wraparound shield layer 34 is disposed so as to surround the main pole 30, and is coupled to the return pole 33. By surrounding the main pole 30 with the wraparound shield layer 34, it is possible to obtain the distribution of the recording magnetic field, steep not only in the direction of track traveling, but also in the direction of the track width, thereby enabling the areal recording density to be enhanced.

In the case of the structure proposed in the past, where the write element 3 is deposited over the read element 2, the following two cases of disposing the wraparound shield layer 34 can be assumed. In a first case, there are disposed a substrate, a read element, a return pole, a main pole, and the shield layer, deposited in that order. In a second case, there are disposed a substrate, a read element, a main pole, the shield layer, and a return pole, deposited in that order.

Figure 22:
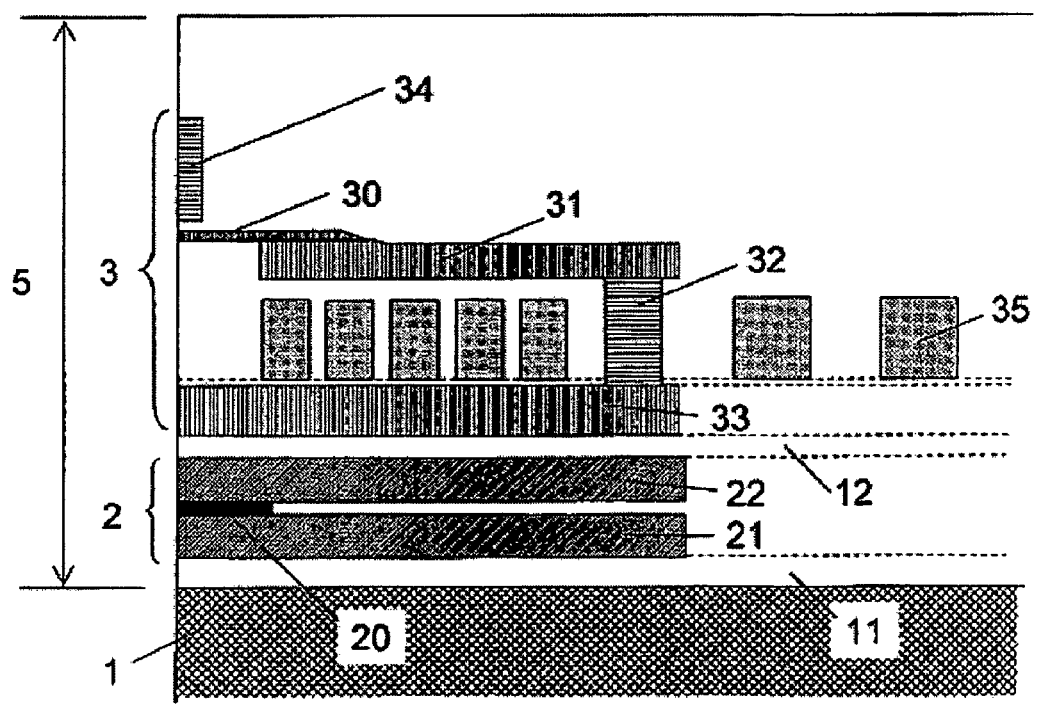
FIG. 22 is a sectional view showing another conventional perpendicular magnetic recording head.

In the first case, as shown in, for example, FIG. 22, the wraparound shield layer 34 is disposed over the main pole 30 in FIG. 1. As a result, there occurs an increase in thickness 5 (from the substrate to an end of a protective film) of the magnetic recording head by the thickness of the wraparound shield layer 34. The magnetic recording head in a tilted posture is floating over the medium, and has the lowest point in the vicinity of the end of the protective film, that is, the end of air stream. In this case, because the flying height of the lowest point decreases to the extent of the increase in the thickness of the magnetic recording head, it can be said that the risk of the magnetic recording head coming into contact with the medium has increased. When maintaining the height of the lowest point, the respective flying heights of the write element, and the read element become relatively higher than before, so that it becomes difficult to enhance areal density.

Figure 23:
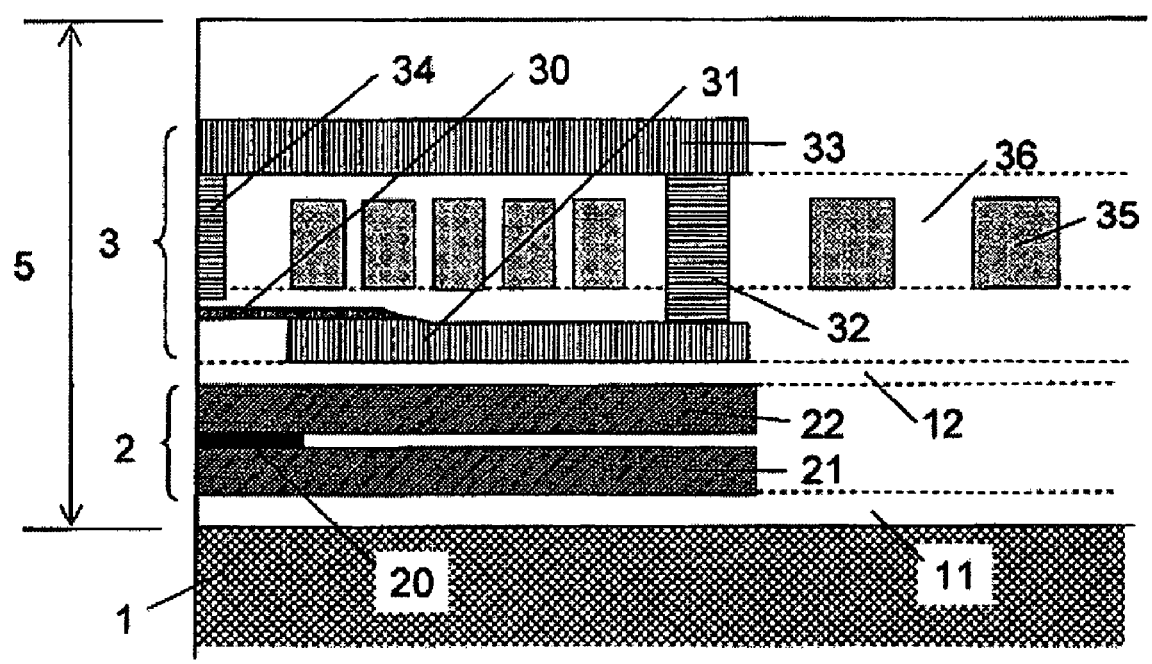
FIG. 23 is a sectional view showing still another conventional perpendicular magnetic recording head.

In the second case, as shown in FIG. 23, the wraparound shield layer 34 is disposed in a layer where the coil is located, so that there occurs no change in the thickness 5 of the magnetic recording head from that in the case of the structure shown in FIG. 1. Consequently, there occurs no problem with the flying height. However, because the main pole 30 is disposed in close proximity of the read element 2, the recording magnetic fluxes exert adverse effects on the read element, thereby causing variation in read waveform. Furthermore, as parts of the recording magnetic fluxes leak to the read element, there occurs deterioration in write performance.

As described above, in the case of the conventional structure, where the write element 3 is deposited over the read element 2, even with the magnetic recording head comprising the wraparound shield layer 34, it has not necessarily been easy to satisfy all of flying property, stable read property, and sufficient write performance.

However, with the adoption of the structure according to the present invention, where the substrate, the main pole, the shield layer, the return pole, and the read element are deposited in that order, the wraparound shield layer 34 can be added immediately on the trailing side, that is, on the upper side of the main pole 30 without causing an increase in the thickness of the magnetic recording head in the whole while maintaining the structure, wherein the main pole and the read element are disposed with the return pole interposed therebetween without disposing the read element so as to be adjacent to the main pole. Hence, the invention enables all of the flying property, stable read property, and sufficient write performance to be satisfied.

In addition, in the case of the structure according to the present embodiment, the recording magnetic fluxes generated by the main pole 30 are fed back through not only the air bearing surface of the return pole 33, but also the air bearing surface of the wraparound shield layer 34 connected to the return pole 33. Without the wraparound shield layer 34, the thickness of the return pole 33 used to be set to about 2 μm, larger than that for other layers, to prevent occurrence of high magnetic field strength, due to convergence of magnetic fluxes returning to the return pole 33. However, when the wraparound shield layer 34 is added, the magnetic fluxes returned are received in a region wider in area, so that convergence of the magnetic fluxes, directly under the return pole 33, no longer occurs. Accordingly, even if the thickness of the return pole 33 is reduced by about 0.5 μm, this will pose no problem. Since reduction in the thickness of the return pole 33 results in reduction in volume thereof, it becomes possible to deter protrusion of the magnetic poles, due to the ambient temperature, thereby enabling lower flying height, and higher reliability of the magnetic recording drive to be implemented.

Embodiment 8

Figure 18:
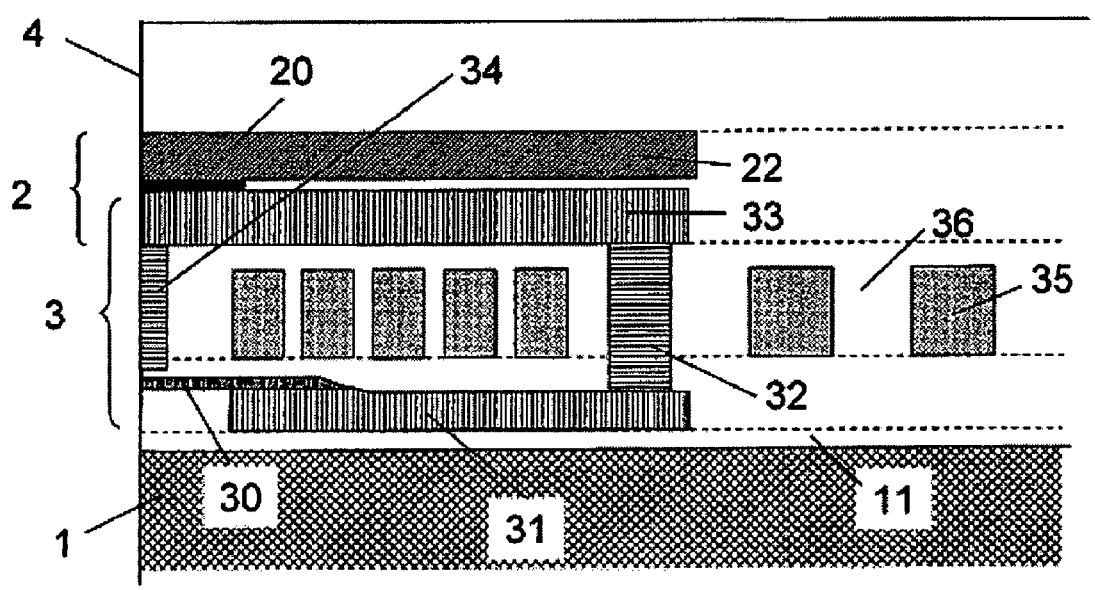
FIG. 18 is a sectional view showing another embodiment of a perpendicular magnetic recording head according to the invention.

With the head according to any of the embodiments described hereinbefore, the return pole 33 can be merged to the lower shield layer 21 as shown in FIG. 18. In such a case, as a constituent material thereof, $Ni_{80}Fe_{20}$ that is more stable in magnetic domain structure is preferably used. In the case of causing the return pole 33 to be merged to the lower shield layer 21, a problem with stability in read waveform often occurs, however, with addition of the wraparound shield layer 34 as shown in FIG. 18, convergence of the magnetic fluxes can be alleviated, and the magnetic domain structure of the return pole 33 merged to the lower shield layer 21 undergoes relative stabilization, so that it is possible to obtain sufficient stability in read waveform. With the adoption of the structure according to the present embodiment, the fabrication process of the magnetic recording head can be simplified and also, the distance d between the main pole 30 and the magnetoresistive sensor 20 can be shortened, so that in the case of the magnetic recording drive of relatively low velocity $\{(v\tau-d)<\delta\}$, a ratio of regions where no information is recorded can be reduced, thereby enhancing the capacity thereof.

The present invention can be applied to not only a magnetic recording head for use in a magnetic recording drive, but also a magnetic sensor integrated with an exothermic body such as a coil, magnetic core, and so forth.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A perpendicular magnetic recording head comprising:

an underlayer formed over a substrate;

a main pole in a plane shape tapered towards an air bearing surface, formed over the underlayer;

coils formed over the main pole, with an insulator interposed therebetween;

a return pole formed over the coils with an insulator interposed therebetween; and a read element formed over the return pole, wherein the substrate, the underlayer, the main pole, the coils, the return pole, and the read element are positioned in that order such that the read element is on a trailing side in relation to the main pole and with respect to a direction of rotation of a recording medium, wherein an auxiliary pole in a plane shape tapered towards the air bearing surface is formed between the underlayer and the main pole.

2. A perpendicular magnetic recording head according to claim 1, further comprising a yoke for magnetically coupling the main pole to the return pole, wherein the respective coils are wound around the yoke, and, a heat diffusion layer is disposed between at least portions of the coils, disposed behind the yoke, from the air bearing surface, and the substrate.

3. A perpendicular magnetic recording head according to claim 1, further comprising a yoke for magnetically coupling the main pole to the return pole, wherein the respective coils are wound around the yoke, and spacing between at least portions of the coils, disposed behind the yoke, from the air bearing surface, and the substrate is formed narrower in comparison with spacing between portions of the coils, disposed on a side of the yoke, adjacent to the air bearing surface, and the substrate.

4. A perpendicular magnetic recording head according to claim 1, wherein the main pole and the auxiliary pole overlap with a depth which is sufficiently large for magnetic fluxes to flow therethrough and sufficiently small to deter remanent magnetization associated therewith.

5. A perpendicular magnetic recording head according to claim 4, the depth of overlap between the main pole and the auxiliary pole is about 2-3 μm.

6. A perpendicular magnetic recording head according to claim 1, wherein the underlayer contains metal.

7. A perpendicular magnetic recording head according to claim 6, further comprising a yoke for magnetically coupling the main pole to the return pole, wherein the respective coils are wound around the yoke, and, a heat diffusion layer is disposed between at least portions of the coils, disposed behind the yoke, from the air bearing surface, and the substrate.

8. A perpendicular magnetic recording head according to claim 6, further comprising a yoke for magnetically coupling the main pole to the return pole, wherein the respective coils are wound around the yoke, and spacing between at least portions of the coils, disposed behind the yoke, from the air bearing surface, and the substrate is formed narrower in comparison with spacing between portions of the coils, disposed on a side of the yoke, adjacent to the air bearing surface, and the substrate.

9. A perpendicular magnetic recording head according to claim 1, further comprising a wraparound shield layer disposed immediately over the main pole on a trailing side thereof.

10. A perpendicular magnetic recording drive comprising:
a perpendicular magnetic recording medium having a perpendicular magnetic recording layer formed over a substrate;
a perpendicular magnetic recording head comprising:
an underlayer formed over a substrate;
a main pole in a plane shape tapered towards an air bearing surface, formed over the underlayer;
coils formed over the main pole, with an insulator interposed therebetween;
a return pole formed over the coils with an insulator interposed therebetween; and
a read element formed over the return pole; and
a write-read operation control module configured to control operation of the perpendicular magnetic recording head, wherein the substrate, the underlayer, the main pole, the coils, the return pole, and the read element are positioned in that order such that the read element is on a trailing side in relation to the main pole and with respect to a direction of rotation of the recording medium, wherein an auxiliary pole in a plane shape tapered towards the air bearing surface is formed between the underlayer and the main pole.

11. A perpendicular magnetic recording drive according to claim 10, wherein the perpendicular magnetic recording head further comprises a yoke for magnetically coupling the main pole to the return pole, wherein the respective coils are wound around the yoke, and, a heat diffusion layer is disposed between at least portions of the coils, disposed behind the yoke, from the air bearing surface, and the substrate.

12. A perpendicular magnetic recording drive according to claim 10, wherein the perpendicular magnetic recording head further comprises a yoke for magnetically coupling the main pole to the return pole, wherein the respective coils are wound around the yoke, and spacing between at least portions of the coils, disposed behind the yoke, from the air bearing surface, and the substrate is formed narrower in comparison with spacing between portions of the coils, disposed on a side of the yoke, adjacent to the air bearing surface, and the substrate.

13. A perpendicular magnetic recording drive according to claim 10, further comprising a mechanism to move the perpendicular magnetic recording head, relative to perpendicular magnetic recording medium with a side of the perpendicular magnetic recording head, adjacent to the main pole, serving as a leading side, and a side thereof adjacent to the read element, serving as a trailing side.

14. A perpendicular magnetic recording drive according to claim 10, wherein the underlayer contains metal.

15. A perpendicular magnetic recording drive according to claim 14, wherein the perpendicular magnetic recording head further comprises a yoke for magnetically coupling the main pole to the return pole, wherein the respective coils are wound around the yoke, and, a heat diffusion layer is disposed between at least portions of the coils, disposed behind the yoke, from the air bearing surface, and the substrate.

16. A perpendicular magnetic recording drive according to claim 14, wherein the perpendicular magnetic recording head further comprises a yoke for magnetically coupling the main pole to the return pole, wherein the respective coils are wound around the yoke, and spacing between at least portions of the coils, disposed behind the yoke, from the air bearing surface, and the substrate is formed narrower in comparison with spacing between portions of the coils, disposed on a side of the yoke, adjacent to the air bearing surface, and the substrate.

17. A perpendicular magnetic recording drive according to claim 10, wherein the perpendicular magnetic recording head further comprises a wraparound shield layer disposed immediately over the main pole on a trailing side thereof.

18. A perpendicular magnetic recording drive according to claim 17, further comprising a mechanism to move the perpendicular magnetic recording head, relative to perpendicular magnetic recording medium with a side of the perpendicular magnetic recording head, adjacent to the main pole, serving as a leading side, and a side thereof adjacent to the read element, serving as a trailing side.

* * * * *